US00RE44045E

(19) United States
(12) Reissued Patent
Kihara et al.

(10) Patent Number: US RE44,045 E
(45) Date of Reissued Patent: Mar. 5, 2013

(54) LASER-WELDED ARTICLE

(75) Inventors: Tetsuji Kihara, Neyagawa (JP); Satoshi Yamamoto, Neyagawa (JP)

(73) Assignee: Orient Chemical Industries, Ltd., Osaka-Shi (JP)

(21) Appl. No.: 13/424,193

(22) Filed: Mar. 19, 2012

Related U.S. Patent Documents

Reissue of:
(64) Patent No.: 7,960,003
Issued: Jun. 14, 2011
Appl. No.: 11/990,692
PCT Filed: Sep. 20, 2006
PCT No.: PCT/JP2006/319098
§ 371 (c)(1),
(2), (4) Date: Feb. 20, 2008
PCT Pub. No.: WO2007/034978
PCT Pub. Date: Mar. 29, 2007

(30) Foreign Application Priority Data

Sep. 21, 2005 (JP) ..... 2005-273999

(51) Int. Cl.
*B32B 3/00* (2006.01)
*B29C 65/16* (2006.01)

(52) U.S. Cl. ..... 428/57; 156/272.8

(58) Field of Classification Search ..... 428/57; 156/272.8
See application file for complete search history.

(56) References Cited

U.S. PATENT DOCUMENTS

| | | | | |
|---|---|---|---|---|
| 5,893,959 | A | 4/1999 | Muellich | |
| 6,265,081 | B1 | 7/2001 | Urabe et al. | |
| 7,713,607 | B2 * | 5/2010 | Sugawara et al. | 428/57 |
| 2003/0039837 | A1 * | 2/2003 | Koshida et al. | 428/411.1 |
| 2003/0125429 | A1 | 7/2003 | Joachimi et al. | |
| 2003/0130381 | A1 | 7/2003 | Joachimi et al. | |
| 2004/0102559 | A1 | 5/2004 | Oyamada et al. | |
| 2005/0203225 | A1 * | 9/2005 | Nakagawa et al. | 524/190 |
| 2005/0208361 | A1 | 9/2005 | Enjoji et al. | |
| 2007/0065659 | A1 | 3/2007 | Kihara et al. | |

FOREIGN PATENT DOCUMENTS

| | | | |
|---|---|---|---|
| DE | 3813570 | A1 | 11/1989 |
| DE | 4303061 | A1 | 8/1993 |
| EP | 1 418 202 | A2 | 5/2004 |
| JP | B-07-014412 | | 2/1995 |
| JP | A-2003-514684 | | 4/2003 |

(Continued)

OTHER PUBLICATIONS

Nov. 27, 2009 Office Action issued in U.S. Appl. No. 11/989,230.

(Continued)

*Primary Examiner* — David Sample
*Assistant Examiner* — Tahseen N Khan
(74) *Attorney, Agent, or Firm* — Oliff & Berridge, PLC

(57) ABSTRACT

It is an object of the present invention to provide a laser-welded article that workpieces prepared simply can be easily unified by laser in one laser welding process without using complicated processes. Moreover, the laser-welded article has sufficient welding strength of the molded workpieces, and does not damage the resin property.

The laser-welded article comprises:

an integral construction of a single weakly laser-absorptive molded workpiece or plural weakly laser-absorptive molded workpieces, which is welded by exothermic through irradiating laser under butting at least a part of edge portions thereof, wherein the workpiece or the workpieces include a thermoplastic resin and a weakly laser absorbent to have an absorbance: a ranging from 0.07 to 3.0, and have abilities of absorbing at least partial beam of the laser and transmitting other partial beam of the laser.

23 Claims, 4 Drawing Sheets

FOREIGN PATENT DOCUMENTS

| | | | |
|---|---|---|---|
| JP | A-2004-148800 | | 5/2004 |
| JP | A-2004-195829 | | 7/2004 |
| JP | A-2004-351370 | | 12/2004 |
| JP | A-2004-351730 | | 12/2004 |
| JP | A-2005-001172 | | 1/2005 |
| JP | A-2005-161620 | | 6/2005 |
| JP | A-2005-246692 | | 9/2005 |
| JP | A-2005-262531 | | 9/2005 |
| JP | A-2005-288947 | | 10/2005 |
| WO | WO 00/03865 | | 1/2000 |
| WO | WO 03/039843 | A1 | 5/2003 |
| WO | WO 2007/034970 | A1 | 3/2007 |

OTHER PUBLICATIONS

Dec. 5, 2006 International Search Report issued in PCT/JP2006/319088.

Jan. 14, 2009 Supplementary European Search Report issued in EP 06 79 8346.

Office Action for U.S. Appl. No. 11/522,321; mailed Nov. 25, 2009,

Klimpel, A., "Diode-Laser Butt Welding of Thermoplastic Sheet", Welding International, XP-001132986, 2002, pp. 845-850.

Apr. 22, 2010 European Office Action issued in European Patent Application No. 06 798 356.9.

* cited by examiner

LASER-WELDED ARTICLE

Matter enclosed in heavy brackets [ ] appears in the original patent but forms no part of this reissue specification; matter printed in italics indicates the additions made by reissue.

TECHNICAL FIELD

The present invention relates to a laser-welded article that weakly laser-absorptive molded workpieces are welded by laser at a time and unified.

BACKGROUND OF THE INVENTION

For mutually joining workpieces made from a synthetic thermoplastic resin, a method for laser welding is known.

Such laser welding is executed for example as follows. As shown in FIG. 4, a laser-transmissible workpiece 11 is used for one workpiece and for the other workpiece, a laser-absorptive workpiece 13 is used. These workpieces are then put together. A laser 14 is irradiated from the side of the laser-transmissible workpiece 11 towards the laser-absorptive workpiece 13. And the laser 14 transmitted through the laser-transmissible workpiece 11 is absorbed into the laser-absorptive workpiece 13, and then exothermic is caused thereat. The exothermic melts the laser-absorptive workpiece 13 mainly at a laser-absorbing part, and then it melts the laser-transmissible workpiece 11 to weld both workpieces. After cooling, the laser-transmissible workpiece 11 and the laser-absorptive workpiece 13 are joined at a welding position 15.

Merits of the laser welding are feasibility of welding workpieces without any contacts of a laser beam source to workpieces being due to weld; little thermal influence on laser-absorbing neighborhood by local exothermic; no threat of mechanical vibration; feasibility of mutually welding fine parts or workpieces having three-dimensionally complicated structures; excellent reproducibility; feasibility of maintaining sufficient airtightness; excellent welding strength; difficulty of recognizing a boundary line of a welding position by visual observation; no generation of dust and so on.

According to the laser welding, it is not only capable of welding certainly by simple operation but also achieving equal or more welding strength compared with prior methods for joining resin parts. Examples of the prior methods for joining resin parts are clamping by a clamp such as a bolt, a screw, a clip and so on, adhering by an adhesive material, vibration welding, ultrasonic welding and so on. Because of its little vibratory or thermal influence on the laser-welded article, the laser welding also achieves labor saving, improvement of productivity, lowering of production costs and so on. Accordingly, in the automobile industry, the electric industry or the electronic industry for example, the laser welding is practical for joining functional parts or electronic parts that are due to avoid the vibratory or thermal influence thereon. Also the laser welding can be adapted for joining resin parts having a complicated shape.

As a technique of the laser welding, a method for the laser welding is mentioned in Japanese Patent Provisional Publication No. 62-49850. In the method, an edge of a laser-absorptive synthetic thermoplastic resin workpiece to which a carbon black that absorbs a laser is added and an edge of a laser-transmissible synthetic thermoplastic resin workpiece are butted, and then a laser is irradiated from the side of the laser-transmissible resin workpiece to weld both workpieces.

In this case, the laser-transmissible molded workpiece and the laser-absorptive molded workpiece need to be prepared separately.

In International Publication No. WO2003/039843, another method for the laser welding is mentioned. In the method, a thermoplastic resin molded workpiece A that absorbs an infrared ray, a thermoplastic resin molded workpiece B and a heat-releasing material C having an infrared ray-transmissible part are in contact in order of C/A/B, and then an infrared ray is irradiated from the side of the heat-releasing material C to weld these workpieces. In this case, it is not necessary to prepare the thermoplastic resin molded workpiece A and the thermoplastic resin molded workpiece B separately, and the workpieces A and B may be similar. However, the specific heat-releasing material C must be used in order to adjust the exothermic at the time of laser welding. Therefore, the working process is complicated.

In Japanese Patent Provisional Publication No. 2004-351730, another method for the laser welding is also mentioned. In the method, a joining flange part is respectively preformed as a joint flap for welding on a laser-transmissible resin workpiece and on the laser-absorptive resin workpiece, and the flange parts of each workpiece are butted. Then, a laser is irradiated from the side of the flange part of the laser-transmissible resin workpiece to weld and unify both resin workpieces. In this case, the laser-transmissible resin workpiece and the laser-absorptive resin workpiece need to be prepared separately.

SUMMARY OF THE INVENTION

The present invention has been developed to solve the foregoing problems. It is an object of the present invention to provide a laser-welded article that is prepared by unifying workpieces simply prepared by a single laser welding process without any complicated processes. Moreover, the laser-welded article has sufficient welding strength of the molded workpieces and does not damage the resin property.

The inventors of the present invention found out that a laser-welded article joined still more firmly compared with a laser-welded article obtained by a conventional laser-welding method in which a laser-transmissible molded workpiece and a laser-absorptive molded workpiece ore welded, can be obtained as follows. Edges of a single or plural weakly laser-absorptive molded workpiece(s), whose absorbance is adjusted to a specific absorbance so that the workpiece absorbs a partial laser and transmits another partial laser, are butted, and then a laser is irradiated thereto to weld the workpiece(s) using exothermic, heat radiation and heat conduction from the molded workpiece. Due to a large and deep melting phenomenon occurred at the welding part, a laser-welded article joined still more firmly is obtained.

A laser-welded article of the present invention developed for accomplishing the foregoing objects comprises:

an integral construction of a single weakly laser-absorptive molded workpiece or plural weakly laser-absorptive molded workpieces, which is welded by exothermic through irradiating laser while keeping at least a part of the edge portions of workpiece(s) butted, wherein the workpiece or the workpieces include a thermoplastic resin and a weakly laser absorbent to have absorbance: a ranging from 0.07 to 3.0, and have abilities of absorbing at least partial beam of the laser and transmitting another partial beam of the laser.

A preferable example of preparing the laser-welded article is as follows. Firstly, the laser is irradiated to the portion where the edges of a workpiece comprising the weakly laser absorbent is butted. Then, a partial laser is absorbed into an interface of the workpieces, exothermic is occurred thereat, and then the exothermic melts the resin while another partial laser transmitted through the workpieces leads a spread of exothermic portion. Finally, a widespread melting is occurred, and the laser-welded article having sufficient strength is obtained.

The weakly laser absorbent has weak absorptiveness to a wavelength of used laser. An absorption coefficient $\epsilon_d$ of the weakly laser absorbent is for example ranging from 1000 to 8000 (ml/g cm), preferably ranging from 1000 to 6000, further preferably ranging from 3000 to 6000. The weakly laser-absorptive molded workpiece comprising the weakly laser absorbent has not only a characteristic of laser-transmissible property but also a characteristic of weak laser-absorptive property.

A single or plural (two or more than three) weakly laser-absorptive molded workpiece(s) may be laser-welded as a laser-welded article. When a single weakly laser-absorptive molded workpiece is used, a part of the workpiece and the other part thereof, for example both edges of the workpiece, or the edge of the workpiece and the central part thereof, are bulled by folding down or bending the workpiece into a roll-shape, and then the laser-welding is performed at the contacting portion. As a result, the laser-welded article is achieved. When plural weakly laser-absorptive molded workpieces are used, a part of the workpiece and a part of another workpiece, for example an edge of the workpiece and an edge of another workpiece, or an edge of the workpiece and a central part of another workpiece, are butted, and then the laser welding is performed at the contacting portion. As a result, the laser-welded article is achieved. The laser-welding may be performed at a part of the weakly laser-absorptive molded workpiece or at plural parts thereof.

The single or plural weakly laser-absorptive molded workpiece(s) may have thickness ranging from 200 to 5000 microns.

The weakly laser-absorptive molded workpiece is obtained by molding a resin composition comprising at least the weakly laser absorbent and the thermoplastic resin. It is preferable that the thermoplastic resin is polyamide resin, polycarbonate resin, polyphenylene sulfide resin, polybutylene terephthalate resin or polypropylene resin. The weakly laser-absorptive molded workpiece preferably comprises one resin selected from the above-mentioned thermoplastic resin.

The weakly laser-absorptive molded workpiece having the absorbance: a ranging from 0.07 to 3.0 is used for the laser-welded article. The edges of the workpiece are butted, and then the laser welding is performed. The absorbance: a is a value converted into the absorbance when the workpiece has the thickness of 1 mm.

It is practical if the weakly laser-absorptive molded workpiece has some transmissibility because a condition of the laser welding such as thickness of the workpiece or a range of irradiation energy of the laser is able to be selected widely. The absorbance: a is preferably ranging from 0.1 to 2.0, further preferably ranging from 0.1 to 1.8.

The range of the practical absorbance: a regarding the preferable resins is shown concretely. If the resin is polyamide resin, the absorbance: a is ranging from 0.1 to 2.0, preferably ranging from 0.1 to 1.2. If the resin is polycarbonate resin, the absorbance: a is ranging from 0.1 to 2.0, preferably ranging from 0.2 to 1.8. If the resin is polypropylene resin, the absorbance: a is ranging from 0.1 to 1.2, preferably ranging from 9.1 to 0.8. If the resin is polybutylene terephthalate resin, the absorbance: a is ranging from 0.1 to 3.0, preferably ranging from 0.15 to 3.0. If the resin is polyphenylene sulfide resin, the absorbance: a is ranging from 0.1 to 3.0, preferably ranging from 0.2 to 3.0.

If the weakly laser-absorptive molded workpiece is formed using polyamide resin, polycarbonate resin or polypropylene resin, an absorption coefficient: $\epsilon_j$ (an absorption coefficient: $\epsilon_{j1}$ and an absorption coefficient: $\epsilon_{j2}$ in case of using two workpieces) to 940 nm of the laser is ranging from 200 to 8000 (l/cm), preferably ranging from 1000 to 8000. If the weakly laser-absorptive molded workpiece is formed using polybutylene terephthalate resin or polyphenylene sulfide resin, an absorption coefficient: $\epsilon_j$ (an absorption coefficient: $\epsilon_{j1}$ and an absorption coefficient: $\epsilon_{j2}$ in case of using two workpieces) is ranging from 3000 to 15000 (l/cm), preferably ranging from 9000 to 14000.

The laser-welded article of the present invention is explained exemplifying a case in which the weakly laser-absorptive molded workpiece 1 and the weakly laser-absorptive molded workpiece 2 are laser-welded as shown in FIG. 1.

The absorbance of the molded workpiece 1 is defined as $a_1$, and the absorbance of the molded workpiece 2 is defined as $a_2$. It is preferable that the ratio $a_1/a_2$ defined by the absorbance: $a_1$ and the absorbance: $a_2$ is ranging from 0.8 to 1.3. It is much preferable that the absorbance $a_1$ and the absorbance $a_2$ are equal and that the ratio $a_1/a_2$ is 1. If the ratio is closer to 1, the appearance, the hue and the joining portion of the laser-welded article look pretty. Moreover, if the absorbance of the workpieces is equal or nearly equivalent, it is not necessary to distinguish the molded workpieces and the treatment thereof at the time of laser welding is simple.

When the weakly laser-absorptive molded workpiece 1 having the absorbance $a_1$ and the weakly laser-absorptive molded workpiece 2 having the absorbance $a_2$ are laser-welded by irradiating the laser from an oblique direction, it is preferable that, for example under a condition of $a_1>a_2$, the laser is irradiated from the side of the weakly laser-absorptive molded workpiece 2 of which the absorbance $a_2$ is lower. The prescribed range of the absorbance of the workpiece may be selected according to a condition of the laser welding.

When the weakly laser-absorptive molded workpiece 1 and the weakly laser-absorptive molded workpiece 2 are used, a product of a concentration $C_1$ (wt %) of the weakly laser absorbent of the workpiece 1 and the thickness $L_1$ (cm) of the workpiece is defined as $C_1L_1$, and a product of a concentration $C_2$ (wt %) of the weakly laser absorbent of the workpiece 2 and the thickness $L_2$ (cm) of the workpiece is defined as $C_2L_2$. It is preferable that at least one of $C_1L_1$ and $C_2L_2$ is ranging from $0.01\times10^{-3}$ to $4.0\times10^{-3}$.

The laser-welded article of the present invention is obtained by welding a single or plural weakly laser-absorptive molded workpiece(s) that has laser-transmissible property and laser-absorptive property, by using laser. Because it is not necessary to distinguish the weakly laser-absorptive molded workpieces, it is easy to manage the workpieces.

The laser-welded article is simply manufactured without any inconvenient pretreatment to the surface of a workpiece for adhering workpieces made from resin or any complicated processes such as alloying. Although the laser-welded article is preferably manufactured by irradiating the laser to the contacting part of the workpieces perpendicularly, the laser-welded article can be manufactured as well by irradiating the laser from either side of the weakly laser-absorptive molded workpieces according to the shape of the workpieces. Furthermore, the laser-welded article can be also manufactured with adjusting an irradiating angle of the laser freely; therefore, the workpiece having complicated shape can be joined. The laser-welded article is welded by laser in one laser welding process and therefore has high productive efficiency.

The intrinsic properties of the resin forming the laser-welded article are not influenced, and the laser-welded article has sufficient welding strength. Furthermore, a void by an excess energy at the melting portion, which is generated at the time of conventional laser-welding of a laser-transmissible molded workpiece and a laser-absorptive molded workpiece, is not generated. And adhesive materials or clamps For joining are not used for the laser-welded article. Therefore, the laser-welded article has excellent recycling property.

DETAILED EXPLANATION OF THE INVENTION

Figure 1:
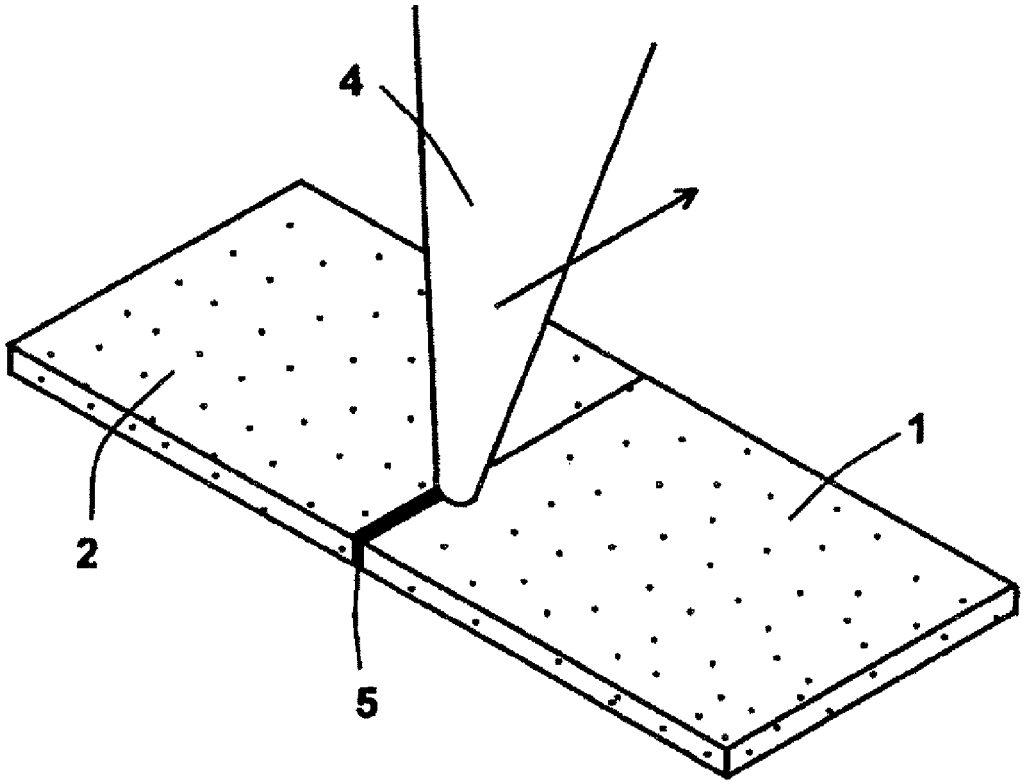
FIG. 1 shows a method for preparing a laser-welded article to which the present invention is applied, by butting each edge portion of plural weakly laser-absorptive molded workpieces.

Hereunder, one embodiment of the laser-welded article of the present invention is explained in detail as referring to FIG. 1 that corresponds to Examples.

Weakly laser-absorptive molded plate workpieces 1 and 2 are used for preparing a laser-welded article of the present invention. When the edge portions of the weakly laser-absorptive molded workpieces 1 and 2 are butted and welded, unlike a conventional laser-welding of piled laser-transmissible molded workpiece and laser-absorptive molded workpiece, it is not necessary to consider a decay of the laser due to a transmissible property of the molded workpiece of the laser-irradiated side. That is to say, the irradiated laser contributes to the melting at the joining part to be laser-welded. Therefore, it is important that the output condition of the laser is adjusted to sufficiently cause exothermic and spread the melt at the joining part, within the range of generating no burn and no void of the molded workpieces.

The weakly laser-absorptive molded plate workpieces 1 and 2 are prepared by the heat-molding of a laser-transmissible resin, which comprises a weakly laser absorbent, of a thermoplastic resin comprising. The weakly laser absorbent has property of absorbing all of the laser 4 or absorbing partial or most of the laser 4 having a wavelength of the laser used for laser-welding while transmitting the residual laser 4. The edges of each weakly laser-absorptive molded plate workpieces 1 and 2 are butted, and they are firmly welded and unified to prepare a laser-welded article.

A laser-welded article is prepared as follows. First, as shown in FIG. 1, the edge of the weakly laser-absorptive molded workpiece 1 and the edge of the weakly laser-absorptive molded workpiece 2 are butted, and then the laser is irradiated to the joining part thereof. Then, exothermic occurs at the neighborhood of laser-irradiated part of the molded workpieces. The resin of the neighborhood of the joining part melts gradually, and then the melting of the resin spreads toward a deep part thereof due to the heat radiation and the heat conduction. If the molded workpieces can transmit the laser, a phenomenon in which the transmitted laser causes exothermic. That is to say, a quantity of the exothermic that generates at the molded workpieces can be adjusted by a value of the absorbance with consideration of the thickness of the molded workpieces and an output power of the laser. Also, the heat conduction or the heat radiation of the interface of the workpieces can be adjusted.

Further preferable example of the laser-welded article is as follows. With molded workpieces absorb quantity of most of the laser, sufficient exothermic occurs at the laser-irradiated part of the molded workpieces, and the resin thereof melts. The melting of the resin spreads toward the joining part of the molded workpieces, and then a large and deep melting generates at the joining part of the molded workpiece 1 and the molded workpiece 2. As a result, a laser-welded article joined firmly can be obtained.

Figure 2:
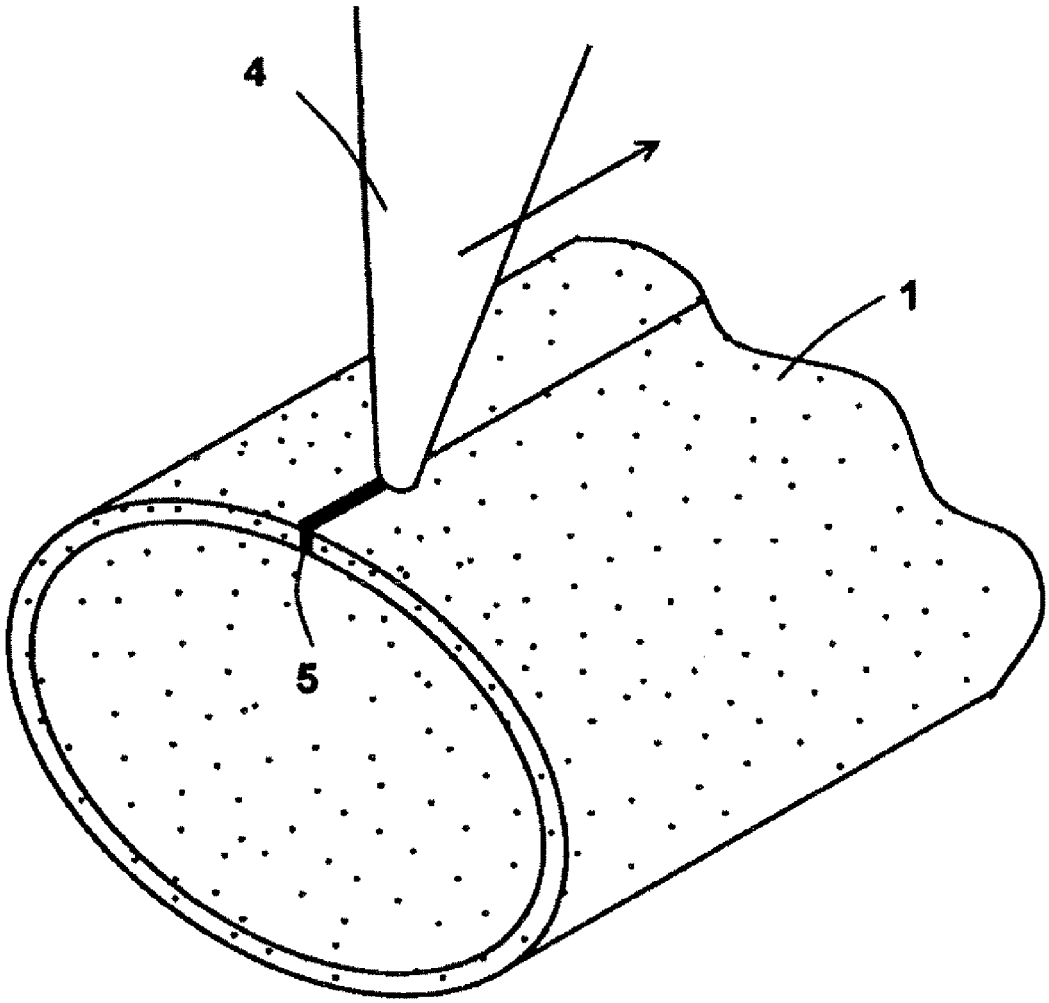
FIG. 2 shows a method for preparing a laser-welded article to which the present invention is applied, by butting both edge portions of curled single weakly laser-absorptive molded workpiece.
Figure 3:
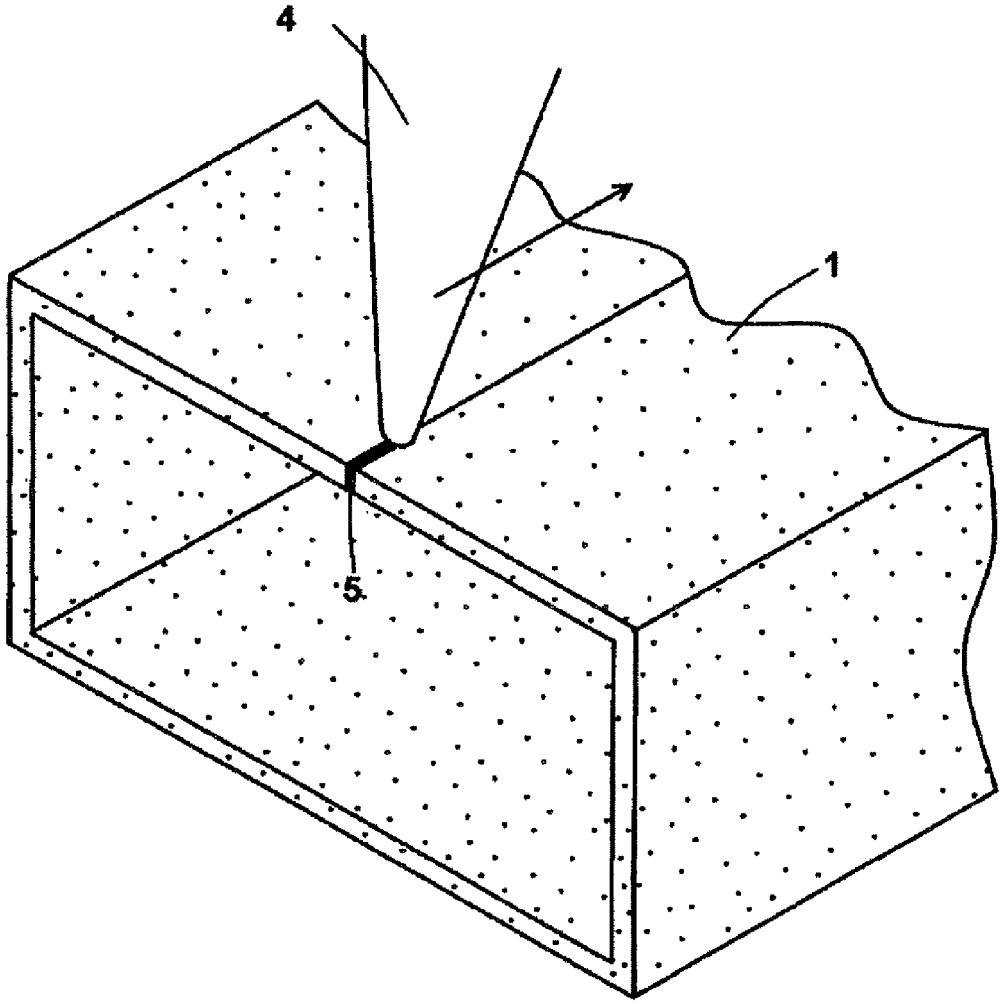
FIG. 3 shows a method for preparing a laser-welded article to which the present invention is applied, by butting both edge portions of folded single weakly laser-absorptive molded workpiece.
Figure 4:
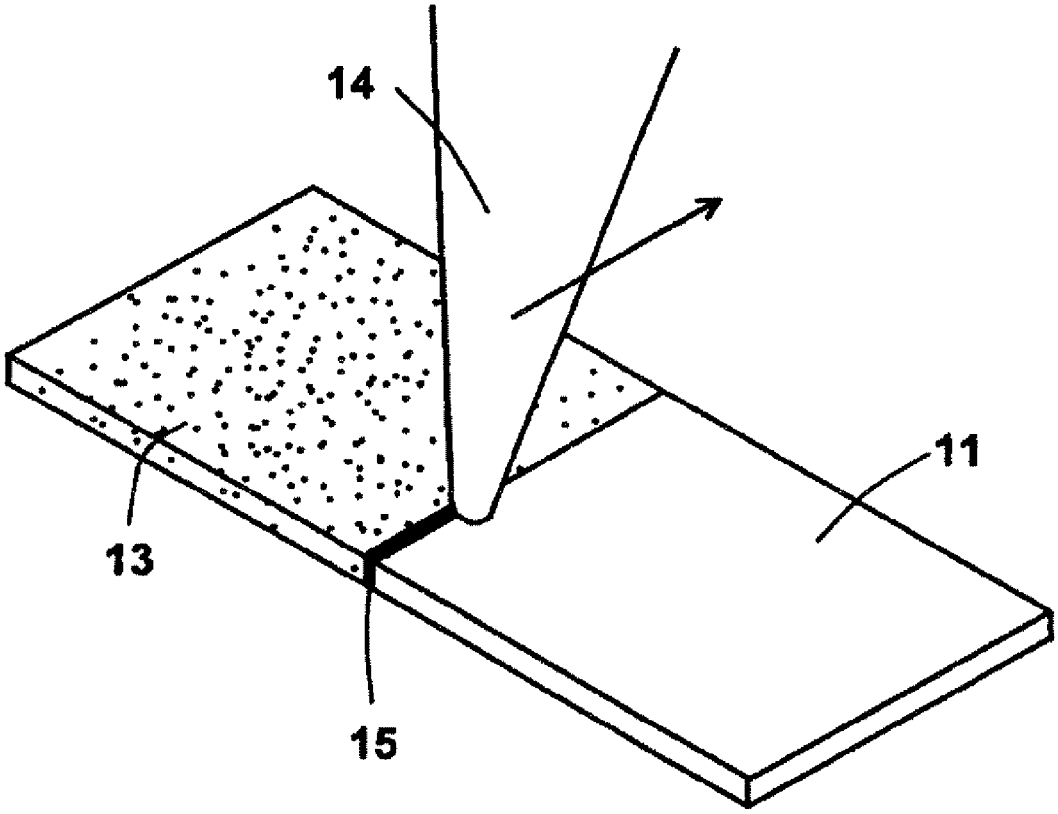
FIG. 4 shows a method for preparing a laser-welded article to which the present invention is not applied.

Weakly laser-absorptive molded plate workpieces 1 and 2, of which edges are butted, are used as shown in FIG. 1, or a single weakly laser-absorptive molded workpiece 1 is used as shown in FIG. 2 or FIG. 3.

One embodiment of a manufacturing process for the laser-welded article is explained in detail. The manufacturing process thereof consists of the following procedures (A) to (D), for example.

(A) A weakly laser-absorptive resin composition which comprises at least a thermoplastic resin and a weakly laser absorbent, and may comprises an additive if necessary, is molded to obtain a weakly laser-absorptive molded workpiece 1. The molded workpiece 1 has the absorbance; $a_1$ ranging from 0.07 to 3.0 to the laser, for example to 940 nm of the laser. The absorbance: $a_1$ is a value measured by using the weakly laser-absorptive molded workpiece 1 having 1000 μm of thickness.

(B) A weakly laser-absorptive molded workpiece 2 for butting to the weakly laser-absorptive molded workpiece 1 is molded. The molded workpiece 2 may be the composition comprising the same composition as the molded workpiece 1, or it may be the composition comprising a combination of different kinds of the composition. The molded workpiece 2 has the absorbance: $a_2$ ranging from 0.07 to 3.0 to the laser, for example to 940 nm of the laser. The absorbance: $a_2$ is a value measured by using the weakly laser-absorptive molded workpiece 2 having 1000 μm of thickness.

(C) The weakly laser-absorptive molded workpiece 1 and the weakly laser-absorptive molded workpiece 2 are put together by butting the edges of the molded workpieces 1 and 2. If necessary on the occasion of fixing the molded workpieces 1 and 2, they may be put together by being pressed with a holding tool. And a material having antireflection property such as an antireflection film may be placed at the laser-irradiated side of the weakly laser-absorptive molded workpiece, and another material having cooling effect or a gas treatment equipment may also be placed thereto.

(D) The laser 4 adjusted to the appropriate condition is irradiated to the joining part of the workpieces. The irradiated laser 4 is absorbed into the laser-irradiated part of the neighborhood of joining part of the molded workpieces 1 and 2, and the exothermic occurs thereat. Then, the resin at the exothermic part melts. Furthermore, the laser further transmitted through the workpieces is absorbed into the workpieces, and then the new exothermic occurs thereat. As a result, a widespread melting of the resin occurs. When the melting position thereof is cooled down, it hardens and then the workpieces are welded. Consequently, the molded workpieces 1 and 2 are firmly joined at a welding position 5 and are unified.

As shown in FIG. 2 and FIG. 3, a single weakly loser-absorptive molded film workpiece 1 may be used for preparing another laser-welded article. The single weakly laser-absorptive molded workpiece 1 is obtained by heat-molding of the thermoplastic resin of the laser-transmissible resin comprising the weakly laser absorbent. The weakly laser absorbent has properties of absorbing all quantity of the laser 4 or absorbing quantity of partial or most of the laser 4 having a wavelength used for the laser welding and transmitting quantity of residual laser. The laser-welded article joined firmly can be obtained by bending the weakly laser-absorptive molded workpiece 1 into a roll-shape, butting at least more than one portion of both edges of the rolled workpiece, and then performing the laser-welding at the joining part.

One embodiment of the manufacturing process for the laser-welded article is explained in detail. The manufacturing process thereof consists of the following procedures (E) to (G), for example.

(E) A weakly laser-absorptive resin composition which comprises at least a thermoplastic resin and a weakly laser absorbent, and may comprise an additive if necessary, is molded to obtain a weakly laser-absorptive molded workpiece 1. The molded workpiece 1 has the absorbance: $a_1$ ranging from 0.07 to 3.0 to the laser, for example to 940 nm of the laser. The absorbance: $a_1$ is a value measured using the weakly laser-absorptive molded workpiece 1 having 1000 μm of thickness.

(F) The weakly laser-absorptive molded workpiece 1 is bent into a roll-shape and put together by butting both edges of the molded workpiece 1. If necessary on the occasion of fixing the edges of the molded workpiece 1, they may be put together by pressing with a holding tool. And a material having antireflection property such as an antireflection film may be placed at the laser-irradiated side of the molded workpiece 1, and another material having cooling effect or a gas treatment equipment may also be placed thereto. The molded workpiece 1 molded into roll-shape or pipe-shape using a metal mold that has roll-shape or pipe-shape may be used.

(G) The laser 4 adjusted to the appropriate condition is irradiated to the joining part of the workpiece. The irradiated laser 4 is absorbed at the laser-irradiated part of the neighborhood of joining part where bath edges of the molded workpiece 1 are butted, and the exothermic occurs thereat. Then, the resin at the exothermic part melts. Furthermore, the laser further transmitted through the workpiece is absorbed into the workpiece, and the exothermic occurs thereat. Consequently, the widespread melting of the resin occurs. When the melting position thereof is cooled down, it hardens, and then the molded workpiece 1 is welded. As a result, the molded workpiece 1 is firmly joined at a welding position 5 and the laser-welded article is obtained.

The present invention is not intended to be limited to these manufacturing processes.

Incidentally, plural weakly laser-absorptive molded flat plate workpieces having even thickness or a single weakly laser-absorptive molded flat film workpiece may be used for the laser-welded article. A single or plural weakly laser-absorptive molded workpiece(s) that is formed by using a metal mold or is curved or bent into roll-shape, pipe-shape, pole-shape or box-shape may be used for the laser-welded article. The weakly laser-absorptive molded workpiece is allowed to take an optional shape.

The heat efficiency of a conventional laser-welding using a laser-transmissible molded workpiece and a laser-absorptive molded workpiece is not so high because exothermic of the laser-absorptive molded workpiece is caused by the irradiated-laser, the laser-absorptive molded workpiece then melts, and then the laser-transmissible molded workpiece melts using the caused exothermic. Furthermore, the welding strength of a laser-welded article prepared by the conventional laser-welding is not so firm because the melting of the resin of the laser-transmissible molded workpiece is small and that of the laser-absorptive molded workpiece is large. In contrast to the conventional laser-welding, the laser-welded article of the present invention has very firm welding strength because the melting part of the resin of the molded workpieces spreads widely.

The laser-welded article has practically sufficient welding strength at the welding position 5 where the weakly laser-absorptive molded workpieces 1 and 2 are welded. The condition of the laser-welding is selected according to the use or the purpose of the laser-welded article. It is preferable that the tensile stress strength of the prepared laser-welded article is 50N or more in accordance with Japanese Industrial Standard K-7113-1495, preferably 200N or more.

As the laser used for the laser-welding, it is preferable that the infrared ray ranging from 800 nm to 1600 nm that is a longer wavelength compared with visible radiation, preferably the one ranging from 800 nm to 1100 nm is used. Examples of the laser are solid laser such as Nd: yttrium aluminum garnet (YAG) excitation and semiconductor laser excitation, semiconductor laser, tunable diode laser, titanium-sapphire laser (Nd: YAG excitation) and so on. Other examples are a halogen lamp and a xenon lamp that generate infrared rays having wavelength of 700 nm or more. The laser is allowed to be irradiated vertically or slantingly towards the surface of the weakly laser-absorptive molded workpiece and also irradiated from single or plural direction (for example both sides of joining part). The output power of the laser is regulated properly according to scanning speed and laser-absorptive property of the weakly laser-absorptive molded workpiece.

When the halogen lamp generating infrared rays having wavelength of 700 nm or more is used, many halogen lamps are arranged to a band-shape. Examples of a laser irradiation procedure are a scanning type that the irradiation source of the lamp moves; a masking type that the welding workpieces move; a multi-irradiating type that the welding workpieces are irradiated by the lamp from multi ways; and so on. An irradiation width, an irradiation time and an irradiation energy of the infrared rays can be adjusted properly. The halogen lamp has an energy distribution centering on near infrared region, so the energy exist at a shorter wavelength side of the energy distribution, that is to say a visible region. In such a case, the energy of the visible region may be shielded using a cut-off filter because a mark of welding may be generated.

The weakly laser-absorptive molded workpiece is explained more concretely.

If the edges of each weakly laser-absorptive molded workpiece 1 and 2 are butted and the workpieces are welded by the exothermic due to the irradiated laser and are unified, the absorbance: $a_1$ of the molded workpiece 1 and the absorbance: $a_2$ of the molded workpiece 2 are $0.07 \leqq (a_1$ and $a_2) \leqq 3.0$ to the laser having a wavelength used for the laser-welding. The absorbances: $a_1$ and $a_2$ is a value measured using the weakly laser-absorptive molded workpiece 1 having 1000 μm of thickness. It is similar if a single weakly laser-absorptive molded workpiece is used.

Considering the laser-transmissible property, the absorbance: a is preferably ranging from 0.1 to 2.0, further preferably ranging from 0.1 to 1.8. If the absorbance is within this range, it is presumed that the irradiated laser is transmitted to the lower workpiece, so sufficient exothermic occurs thereat and then widespread melting phenomenon is easy to occur and the melting phenomenon having few difference of temperature occurs. Consequently, the laser-welded article joined firmly can be obtained. Furthermore, it is easy to deal with when the thickness of the molded workpiece is changed to obtain the various laser-welded articles.

The range of the practical absorbance: a about the preferable resins is shown concretely. If the resin is polyamide resin, the absorbance: a is ranging from 0.1 to 2.0, preferably ranging from 0.1 to 1.2. If the resin is polycarbonate resin, the absorbance: a is ranging from 0.1 to 2.0, preferably ranging from 0.2 to 1.8. If the resin is polypropylene resin, the absorbance: a is ranging from 0.1 to 1.2, preferably ranging from 0.1 to 0.8. If the resin is polybutylene terephthalate resin, the absorbance: a is ranging from 0.1 to 3.0, preferably ranging from 0.15 to 3.0. If the resin is polyphenylene sulfide resin, the absorbance: a is ranging from 0.1 to 3.0, preferably ranging from 0.2 to 3.0.

It is preferable that the absorbance: $a_1$ of one molded workpiece and the absorbance: $a_2$ of the other molded workpiece satisfy a condition of $0.5 \leqq a_1/a_2 \leqq 2.0$, it is much preferable that $a_1$ and $a_2$ satisfy a condition of $0.8 \leqq a_1/a_2 \leqq 1.3$. For example, the absorbance $a_1$ and the absorbance $a_2$ of the weakly laser-absorptive molded workpieces 1 and 2 may satisfy numerical equations of $a_1 \geqq a_2$, $a_1 \leqq a_2$ or $a_1 = a_2$.

It is much preferable that the absorbance $a_1$ and the absorbance $a_2$ is a same value, that is to say $a_1$ and $a_2$ satisfy a numerical equation of $a_1 = a_2$, when the appearance, the hue and the joining portion of the laser-welded article is considered. And if the absorbance of the workpieces is equal or nearly equivalent, it is not necessary to distinguish two kinds of the molded workpieces and the treatment thereof at the time of laser welding is simple.

In order to adjust the absorbance of the weakly laser-absorptive molded workpiece 1 within above-mentioned range, it is necessary to select the absorption coefficient $\epsilon_d$ of the weakly laser absorbent and to adjust the concentration $C_1$ (wt %) of the weakly laser absorbent, according to the thickness $L_1$ (cm) of the weakly laser-absorptive molded workpiece 1. It is also similar about the thickness $L_2$ (cm) of the weakly laser-absorptive molded workpiece 2 and the concentration $C_2$ (wt %) of the weakly laser absorbent thereof.

It is important that the absorption coefficient $\epsilon_{j1}$ and the absorption coefficient $\epsilon_{j2}$ of the weakly laser-absorptive molded workpieces 1 and 2 are adjusted to a desired range.

It is similar if a single weakly laser-absorptive molded workpiece is used.

If polyamide resin, polycarbonate resin and polypropylene resin are used, the absorption coefficient $\epsilon_{j1}$ and the absorption coefficient $\epsilon_{j2}$ for the laser of 940 nm are for example $200 \leqq \epsilon_{j1}$ (and $\epsilon_{j2}$) $\leqq 8000$ (l/cm), preferably $2000 \leqq \epsilon_{j1}$ (and $\epsilon_{j2}$) $\leqq 7500$, further preferably $4000 \leqq \epsilon_{j1}$ (and $\epsilon_{j2}$) $\leqq 7000$.

If polybutylene terephthalate resin and polyphenylene sulfide resin are used, the absorption coefficient $\epsilon_{j1}$ and the absorption coefficient $\epsilon_{j2}$ for the laser of 940 nm are for example $3000 \leqq \epsilon_{j1}$ (and $\epsilon_{j2}$) $\leqq 15000$ (l/cm), preferably $5000 \leqq \epsilon_{j1}$ (and $\epsilon_{j2}$) $\leqq 15000$, further preferably $8000 \leqq \epsilon_{j1}$ (and $\epsilon_{j2}$) $\leqq 13000$.

If the absorption coefficient is more than the above-mentioned range, a sudden exothermic of the weakly laser-absorptive molded workpiece occurs at the time of laser irradiation, and it is difficult to inhibit the generation of the burn or the void of the molded workpiece. As a result, the laser-welded article cannot achieve sufficient welding strength. If the absorption coefficient is less than the above-mentioned range, insufficient exothermic occurs, so the laser-welded article cannot achieve sufficient welding strength.

If $C_1L_1$ that is a product of a concentration $C_1$ (wt %) of the weakly laser absorbent of one molded workpiece and a thickness $L_1$ (cm) of the workpiece, and $C_2L_2$ that is a product of a concentration $C_2$ (wt %) of the weakly laser absorbent of another molded workpiece and a thickness $L_2$ (cm) of the workpiece, are ranging $0.01 \times 10^{-3} \leqq (C_1L_1$ and $C_2L_2) \leqq 4.0 \times 10^{-3}$, the laser-welding is performed more excellently.

It is preferable that the weakly laser-absorptive molded workpieces 1 and 2 have the thickness of ranging from 200 to 5000 microns respectively. If the thickness is less than 200 microns, it is difficult to control the laser energy. Therefore, the melting by the exothermic in the laser welding process is insufficient or excess. As a result, the laser-welded article is broken by overheating or cannot achieve sufficient welding strength. On the other hand, if the thickness is more than 5000 microns, a distance between the surface of the weakly laser-absorptive molded workpiece and the welded portion 5 is too long. Therefore, the transmissivity for the laser decreases. As a result, the laser-welded article cannot achieve sufficient welding strength.

Examples of the weakly laser absorbent included in the weakly laser-absorptive molded workpiece are azine-type compound, nigrosine, aniline black, phthalocyanine, naphthalocyanine, porphyrin, cyanin-type compound, perylene, quaterrylene, metal complex, azo dye, anthraquinone, square acid derivative, immonium dye and so on. The absorption coefficient $\epsilon_d$ of the weakly laser-absorbent is ranging from 1000 to 8000 (ml/g cm), preferably ranging from 1000 to 6000, further preferably ranging from 3000 to 6000.

A measuring procedure of the absorption coefficient $\epsilon_d$ is as follows. 0.05 g of the weakly laser absorbent is precisely weighed and is dissolved into solvent such as N,N-dimethylformamide (DMF) by using 50 ml type measuring flask. A measuring sample is obtained by diluting 1 ml of the solution by DMF using 50 ml type measuring flask. Then the absorbance of the measuring sample is measured by using a spectrophotometer of catalog No. UV1600PC that is available from Shimadzu Corporation.

The coloring of the thermoplastic resin is performed for the purpose of a decorative effect, a color classification effect, improvement of light resistance of the molded product, protection or masking of the contents. A black-coloring is the most important in the industrial field. Considering the dispersibility or the compatibility of the resin, an oil-soluble dye is suitable. Therefore, a black oil-soluble dye that can be used for black colorant and for the weakly laser absorbent is the most suitable. In the black oil-soluble dye, nigrosine is preferable because more sufficient welding strength is achieved.

Examples of nigrosine are a black azine-type condensed mixture such as C. I. Solvent Black 5 and C. I. Solvent Black 7 described on Color Index. In the black azine-type condensed mixture, C. I. Solvent Black 7 is preferable. The nigrosine is synthesized by reaction of oxidation and dehydrating condensation of aniline, aniline hydrochloride and nitrobenzene at 160° C. or 180° C. as reaction temperature under the existence of iron chloride. As such nigrosine, NUBIBN BLACK series that is available from Orient Chemical Industries, Ltd. is marketed.

The content of the weakly laser absorbent is ranging from 0.001 to 0.8 weight %, preferably ranging from 0.01 to 0.5 weight %, to the laser-transmissible resin. If the content is less than 0.001 weight %, exothermic by absorbing the laser energy is weak. Therefore, the temperature is not sufficiently increased, and thus the welding strength of the joining part between the weakly laser-absorptive molded workpieces decreases. On the other hand, if the content is more than 0.8 weight %, the exothermic temperature is too high, and thus the burn and the void are easy to generate. As a result, sufficient welding strength between the weakly loser-absorptive molded workpieces cannot be achieved.

As the laser-transmissible resin forming the molded workpiece, any kind of the resin that is able to transmit the laser and to contain the weakly laser absorbent may be used.

Examples of the laser-transmissible resin are a resin having laser-transmissible property used as a dispersant for the pigment, and known resin used as carrier resin of masterbatch or colored pellets. Concrete typical examples of the resin are thermoplastic resins such as polyphenylene sulfide resin (PPS); polyamide resin (Nylon: a registered trademark, PA); polyolefin resin illustrated with polyethylene resin, polypropylene resin; polystyrene resin; polymethylpentene resin; methacrylate resin; acrylpolyamide resin; ethylenevinylalcohol (EVOH) resin; polycarbonate resin; polyester resin illustrated with polyethylene terephthalate resin (PET), polybutylene terephthalate resin (PBT); polyacetal resin; polyvinyl chloride resin; polyvinylidene chloride resin; polyphenylene oxide resin; polyarylate resin; polyallylsulfone resin; fluorine-contained resin; liquid crystal polymer and so on.

Further, the thermoplastic resin is allowed to be a copolymer resin made from two or more monomers that construct the above-mentioned thermoplastic resins. Concrete examples of the copolymer resin are acrylonitrile-styrene copolymer resin (AS), acrylonitrile-butadiene-styrene copolymer resin (ABS), acrylonitrile-ethylene propylene diene monomer-styrene copolymer resin (AES), polyamide-polybutylene terephthalate copolymer resin (PA-PBT), polyethylene terephthalate-polybutylene terephthalate copolymer resin (PET-PBT), polycarbonate-polybutylene terephthalate copolymer resin (PC-PBT), polycarbonate-polyamide copolymer resin (PC-PA) and so on. And other concrete examples of the resin are a thermoplastic elastomer such as polystyrene-type thermoplastic elastomer, polyolefin-type thermoplastic elastomer, polyurethane-type thermoplastic elastomer, and polyester-type thermoplastic elastomer; synthetic wax or natural wax that contains the above-mentioned resins as the main component. Incidentally, molecular weight of the thermoplastic resins is not intended to be limited. Also, the different resins may be used plurally.

It is preferable that the thermoplastic resin is polyamide resin, polycarbonate resin, polyphenylene sulfide resin, polybutylene terephthalate resin, or polypropylene resin. In this resins, polyamide resin and polycarbonate resin are further preferable, considering the compatibility of the resin to nigrosine.

Examples of the polyamide resin are polyamide 6, polyamide 66, polyamide 46, polyamide 11, polyamide 12, polyamide 69, polyamide 610, polyamide 612, polyamide 96, non-crystal polyamide, polyamide having high melting point, polyamide RIM, polyamide MIX6 and so on; copolymer of two or more kinds thereof such as polyamide 6/66 copolymer, polyamide 6/66/610 copolymer, polyamide 6/66/11/12 copolymer, crystal polyamide/non-crystal polyamide copolymer and so on. The polyamide resin may be mixed polymer of polyamide resin and another synthetic resin. Examples of the mixed polymer are polyamide/polyester mixed polymer, polyamide/polyphenyleneoxide mixed polymer, polyamide/polycarbonate mixed polymer, polyamide/polyolefin mixed polymer, polyamide/styrene/acrylonitrile mixed polymer, polyamide/polyacrylate mixed polymer, polyamide/silicone mixed polymer and so on. These polyamide resins may be used solely or plurally.

The polyphenylene sulfide resin is a polymer mainly having a repeated unit of thiophenylene group represented by "-ϕ-S-" styled as PPS whose ϕ is a phenylene group having substitutional groups or having no substitutional group. The polyphenylene sulfide resin is polymerized from a monomer synthesized by reacting p-dichlorobenzene and alkali sulfide under high temperature and high pressure. The resin is broadly classified into two types. One type is a strait-chain-type resin having the desired polymerization degree that the monomers are merely polymerized under the presence of an auxiliary initiator. The other type is a crosslinking-type resin that prepolymers are crosslinked by heat under presence of oxygen. The strait-chain-type resin is preferable because the transmissivity thereof is sufficient. Melting viscosity of the polyphenylene sulfide resin (PPS) is not intended to be limited if the polyphenylene sulfide resin can be knead with melting. However, generally the resin having the melting viscosity ranging from 5 to 2000 Pa·s is used. It is preferable that the melting viscosity thereof is ranging from 100 to 600 Pa·s.

The polyphenylene sulfide resin is allowed to use polymer alloy. Examples of the polymer alloy are PPS/polyolefin-type alloy, PPS/polyamide-type alloy, PPS/polyester-type alloy, PPS/polycarbonate-type alloy, PPS/polyphenylene ether-type alloy, PPS/liquid crystal polymer-type alloy, PPS/polyimide-type alloy, and PPS/polysulfone-type alloy. The polyphenylene sulfide resin has relevant properties for electronic parts, automotive parts and so on.

Examples of the polyester resin are polyethylene terephthalate resin that is prepared by condensation polymerization of terephthalic acid and ethylene glycol, and polybutylene terephthalate resin that is prepared by condensation polymerization of terephthalic acid and butylene glycol. Examples of other polyester resins are copolymers that a part of the terephthalic acid component of the polyester resin, for example 15 mol % or less such as 0.5 to 15 mol %, preferably 5 mol % or less such as 0.5 to 5 mol %, and/or a part of ethylene glycol component or butylene glycol component thereof for example 15 mol % or less such as 0.5 to 15 mol %, preferably 5 mol % or less such as 0.5 to 5 mol %, are substituted for the other components. It may be blended two or more polyester resins.

The polyolefin type resin is not intended to be limited. Examples of the polyolefin type resin are a homopolymer of alpha olefin such as ethylene, propylene, butene-1,3-methylbutene-1,4-methylpentene-1, octene-1 and so on, and a copolymer of these olefins. Another example of the polyolefin type resin is a copolymer of the above-mentioned olefins and an unsaturated monomer that can co-polymerize with them. The copolymer may be a block copolymer, a random copolymer, or a graft copolymer. Concrete examples of the polyolefin resin are polyethylene type resin such as high-density polyethylene, middle-density polyethylene, low-density polyethylene, low-density polyethylene having a straight chain, ethylene-vinyl acetate copolymer, ethylene-ethyl acrylate copolymer and so on; polypropylene-type resin such as propylene homopolymer, propylene-ethylene block copolymer, or propylene-ethylene random copolymer, propylene-ethylene-butene-1 copolymer and so on; polybutene-1; poly (4-methylpentene-1). They can be used solely or plurally. It is preferable that the polyolefin resin is the polypropylene resin and/or the polyethylene resin, preferably the polypropylene-type resin. The polypropylene-type resin is not intended to be limited and is used within extensive molecular weight.

Incidentally, the polyolefin-type resin may be an acid-denaturalized polyolefin that is denaturalized by an unsaturated carboxylic acid or the derivative thereof; a foam resin prepared by using a foaming agent such as foam polypropylene. And the polyolefin-type resin may include ethylene-alpha-olefin-type copolymer rubber; ethylene-alpha-olefin-non-conjugated diene-type compound copolymer such as ethylene propylene diene-type monomer (EPDM) and so on;

ethylene-aromatic monovinyl compound-conjugated diene-type compound copolymer rubber, or hydrogenated rubber of the above.

Polycarbonate is a thermoplastic resin having bindings of carbonic ester in principle chain thereof. Polycarbonate has an excellent mechanical property, heat resistance, cold resistance, electrical property, transparency and so on and is a typical engineering plastic. Polycarbonate that is industrially manufactured at present is aromatic polycarbonate made from bisphenol A. Examples of method for manufacturing thereof are a method using phosgene and a method by ester interchange. The molecule thereof has a liner chemical structure that many carbonic ester groups having aromatic hydrocarbon group are bound. The chemical structure has bulky benzene rings and flexible carbonate groups in the principle chain. The bulky benzene rings accomplish high temperature for thermal deforming and excellent physical or mechanical properties. The flexible carbonate groups contribute to moldability and flexibility, however easily cause hydrolysis by alkali.

For preparing the molded workpiece, the laser-transmissible resin may include various additives if necessary. Examples of the additive are colorant, a reinforce, a filler, an ultraviolet-absorptive agent (or a light-stabilizer), an antioxidant, an antibacterial agent, a fungicide, a flame retarder, an auxiliary coloring agent, a dispersant, a stabilizer, a plasticizer, a reforming agent, an antistatic agent, a lubricant, a mold releasing agent, a crystallization accelerator, a crystalline germ agent, and so on.

The structure and the hue of the colorant is not intended to be limited if the colorant can satisfy the above-mentioned condition about the molded workpiece. Concrete examples of the colorant are various organic dyes or pigments of azomethine-type, anthraquinone-type, quinacridone-type, dioxazine-type, diketopyrrolopyrrole-type, anthrapyridone-type, isoindolinone-type, indanthrone-type, perinone-type, perylene-type, indigo-type, thioindigo-type, quinophthalone-type, quinoline-type, and triphenylmethane-type.

If the absorbent used for the molded workpiece is a black absorbent or a dark-colored absorbent, an excellent black molded workpiece is obtained by mixing the black colorant according to the hue and the concentration of the absorbent. Examples of mixing black colorant are a combination of blue colorant and yellow colorant and red colorant, a combination of violet colorant and yellow colorant, a combination of green colorant and red colorant. If the absorbent is a pastel-colored absorbent, a colored molded workpieces of various colors are obtained by combining with the colorant suitably.

Furthermore, the laser-transmissible resin may include a white pigment such as titanium oxide, zinc white, calcium carbonate, alumina white; or a organic white pigment. Chromatic pigments may be prepared by combining achromatic pigments with the organic dyes or pigments.

The reinforcer, which is used for general reinforcement of a synthetic resin, is not intended to be limited. Examples of the reinforcer are a glass fiber, a carbon fiber, other inorganic fibers, and other organic fibers made from aramid, polyphenylene sulfide resin, polyamide, polyester, liquid crystal polymer and so on. The glass fiber is preferable for the reinforcement of the resin, which is required a transparent. In order to practically use the glass fiber, it is preferable that the length of the glass fiber is ranging from 2 to 15 mm and the diameter thereof is ranging from 1 to 20 microns. A shape of the glass fiber is not intended to be limited. Examples of the shape thereof are a roving, a milled fiber and so on. The glass fiber can be used solely or plurally. The content of the glass fiber is preferably ranging from 5 to 120 parts by weight to the weakly laser-absorptive molded workpiece of 100 parts by weight. If the content of the glass fiber is less than 5 parts by weight, it is difficult to achieve sufficient reinforcement effect of the glass fiber. If the content is more than 120 parts by weight, moldability tends to decrease. The content of the glass fiber is preferably ranging from 10 to 60 parts by weight, further preferably ranging from 20 to 50 parts by weight.

Examples of the filler are a plate-shaped filler such as mica, sericite and glass flakes; silicate such as talc, kaolin, clay, wollastonite, bentonite, asbestos and alumina silicate; metal oxide such as alumina, silicon oxide, magnesium oxide, zirconium oxide and titanium oxide; carbonate such as calcium carbonate, magnesium carbonate and dolomite; sulfate such as calcium sulfate and barium sulfate; granular filler such as glass beads, ceramic beads, boron nitride and silicon carbide.

Examples of the ultraviolet-absorptive agent or the light-stabilizer are a benzotriazole-type compound, a benzophenone-type compound, a salicylate-type compound, a cyanoacrylate-type compound, a benzoate-type compound, an oxanilide-type compound, a hindered amine-type compound and a nickel complex salt.

Examples of the antioxidant are a phenol-type compound, a phosphorus compound, a sulfur compound and a thioether-type compound.

Examples of the antibacterial agent and the fungicide are 2-(4'-thiazolyl) benzimidazole, 10,10'-oxybisphenoxyarsine, N-(fluorodichloromethylthio)phthalimide and zinc bis(2-pyridylthio-1-oxide).

Examples of the flame retarder are a halogen-contained compound such as tetrabromobisphenol A derivative, hexabromodiphenylether and tetrabromophthalic anhydride; a phosphorus-contained compound such as triphenylphosphate, triphenylphosphite, red phosphorus and ammonium polyphosphate; a nitrogen-contained compound such as urea and guanidine; a silicon-contained compound such as silicon oil, organic silane and aluminum silicate; an antimony compound such as antimony trioxide and antimony phosphate.

The molded workpiece may be prepared by using a masterbatch of desired colored thermoplastic resin composition. The masterbatch may be prepared by an arbitrary method. For example, the masterbatch may be prepared by mixing a resin powder or pellets as the base of the masterbatch and the colorant with a mixer such as a tumbler, a supermixer and so on, heating and melting the mixture with an extruder, a batch-type kneader or a roll-type kneader and so on, and then forming pellets or grain.

Molding process of the molded workpiece may be executed by general various procedures. For example, the molding process may be executed by using the colored pellets with a processing machine such as an extruder, an injection molding machine, a roll mill and so on. Another molding process may be executed with the proper mixer by mixing the pellets or the grain made from a transparent resin, a granulated colorant, and if necessary, various additives, and then the mixture is molded with a processing machine. Another molding process may be executed by adding the colorant to a monomer including a proper polymerization catalyst, polymerizing the mixture to obtain the desired resin, and then molding the obtained resin by a proper procedure. Examples of the molding procedure may be general molding procedures such as injection molding, extrusion molding, compression molding, foaming molding, blow molding, vacuum molding, injection blow molding, rotational molding, calendaring molding, solution casting and so on. The molded workpieces having various shapes are obtained by these molding procedures.

Following examples describe embodiments concretely. The present invention is not intended to be limited to specific embodiments.

The weakly laser-absorptive molded workpieces were manufactured experimentally by using a polyamide 66 resin or a fiber-reinforced polyamide 6 resin, and then the edge portions of the molded workpieces were butted as shown in FIG. 1 to FIG. 3 and were welded by the laser. Examples of experimentally manufacturing the laser-welded articles to which the present invention was applied are shown in Examples 1 to 10. Examples of the laser-welded articles to which the present invention was not applied are shown in Comparative Examples 1 to 2.

Example 1

(1-a) Preparation of Weakly Laser-Absorptive Molded Workpiece 497.5 g of a polyamide 66 resin of catalog No. ZYTEL 101NC available from Du Pont that ZYTEL is a registered trademark and 2.5 g of nigrosine of catalog No. CRAMITY 81 available from Orient Chemical Industries, Ltd. that CRAMITY is a registered trademark, were added in a tumbler made of stainless steel and were mixed with stirring for 1 hour. The obtained mixture was molded at 280° C. of temperature of a cylinder and 60° C. of temperature of a metal mold with general procedures using an injection molding machine of catalog No. Si-50 that is available from Toyo Machinery & Metal Co., Ltd. Then two weakly laser-absorptive molded workpieces 1 and 2 having the length of 80 mm, the width of 50 mm and the thickness of 1 mm were prepared.

(1-b) Manufacture of Laser-Welded Article

Then, the edges of each weakly laser-absorptive molded workpiece 1 and 2 were butted and put together as shown in FIG. 1. The diode laser machine having 10 W of the output power that is available from Fine Device Co., Ltd. was used. The scanning laser beam 4 of the wavelength of 940 nm was continuously irradiated along an interface of the workpieces 1 and 2 under 2 mm/sec. of scanning speed for 20 mm to obtain a laser-welded article joined uniformly.

Incidentally the absorption coefficient: $\epsilon_d$ of the nigrosine of CRAMITY (the registered trademark) 81 in DMF was $5.9\times10^3$ (ml/g·cm).

The absorbance and the absorption coefficient of the weakly laser-absorptive molded workpieces evaluated by following procedures were shown in Table 1. The result of the laser-welding was also shown in Table 1.

Example 2

(2-a) Preparation of Weakly Laser-Absorptive Molded Workpiece 498.5 g of a polyamide 66 resin of catalog No. ZYTEL 101NC available from Du Pont that ZYTEL is a registered trademark and 1.5 g of nigrosine of catalog No. CRAMITY 81 available from Orient Chemical industries, Ltd. that CRAMITY is a registered trademark, were added in a tumbler made of stainless steel and were mixed with stirring for 1 hour. The obtained mixture was molded at 280° C. of temperature of a cylinder and 60° C. of temperature of a metal mold with general procedures using an injection molding machine of catalog No. Si-50 that is available from Toyo Machinery & Metal Co., Ltd. Then two weakly laser-absorptive molded workpieces 1 and 2 having the length of 80 mm, the width of 50 mm and the thickness of 1 mm were prepared.

(2-b) Manufacture of Laser-Welded Article

Then, the edges of each weakly laser-absorptive molded workpiece 1 and 2 were butted and put together as shown in FIG. 1. The diode laser machine having 10 W of the output power that is available from Fine Device Co., Ltd. was used. The scanning laser beam 4 of the wavelength of 940 nm was continuously irradiated along an interface of the workpieces 1 and 2 under 2 mm/sec. of scanning speed for 20 mm to obtain a laser-welded article joined uniformly.

The absorbance and the absorption coefficient of the weakly laser-absorptive molded workpieces evaluated by following procedures were shown in Table 1. The result of the laser-welding was also shown in Table 1.

Example 3

(3-a[1]) Preparation of Weakly Laser-Absorptive Molded Workpiece 499.4 g of a polyamide 66 resin of catalog No. ZYTEL 101NC available from Du Pont that ZYTEL is a registered trademark and 0.6 g of nigrosine of catalog No. CRAMITY 81 available from Orient Chemical Industries, Ltd. that CRAMITY is a registered trademark, were added in a tumbler made of stainless steel and were mixed with stirring for 1 hour. The obtained mixture was molded at 280° C. of temperature of a cylinder and 60° C. of temperature of a metal mold with general procedures using an injection molding machine of catalog No. Si-50 that is available from Toyo Machinery & Metal Co., Ltd. Then the weakly laser-absorptive molded workpiece 1 having the length of 80 mm, the width of 50 mm and the thickness of 1 mm was prepared.

(3-a[2]) Preparation of Weakly Laser-Absorptive Molded Workpiece 499.4 g of a polyamide 66 resin of catalog No. ZYTEL 101NC available from Du Pont that ZYTEL is a registered trademark and 0.6 g of nigrosine of catalog No. CRAMITY 81 available from Orient Chemical industries, Ltd. that CRAMITY is a registered trademark, were added in a tumbler made of stainless steel and were mixed with stirring for 1 hour. The obtained mixture was molded at 280° C. of temperature of a cylinder and 60° C. of temperature of a metal mold with general procedures using an injection molding machine of catalog No. Si-50 that is available from Toyo Machinery & Metal Co., Ltd. Then the weakly laser-absorptive molded workpiece 2 having the length of 80 mm, the width of 50 mm and the thickness of 2 mm was prepared.

(3-b) Manufacture of Laser-Welded Article

Then, the edges of each weakly laser-absorptive molded workpiece 1 and 2 were butted and put together as shown in FIG. 1. The diode laser machine having 10 W of the output power that is available from Fine Device Co., Ltd. was used. The scanning laser beam 4 of the wavelength of 940 nm was continuously irradiated along an interface of the workpieces 1 and 2 under 1 mm/sec. of scanning speed for 20 mm to obtain a laser-welded article joined uniformly.

The absorbance and the absorption coefficient of the weakly laser-absorptive molded workpieces evaluated by following procedures were shown in Table 1. The result of the laser-welding was also shown in Table 1.

Example 4

(4-a) Preparation of Weakly Laser-Absorptive Molded Workpiece 499.5 g of a polyamide 66 resin of catalog No. ZYTEL 101NC available from Du Pont that ZYTEL is a registered trademark and 0.5 g of nigrosine of catalog No. CRAMITY 81 available from Orient Chemical Industries, Ltd. that CRAMITY is a registered trademark, were added in a tumbler made of stainless steel and were mixed with stirring for 1 hour. The obtained mixture was molded at 280° C. of temperature of a cylinder and 60° C. of temperature of a metal mold with general procedures using an injection molding machine of catalog No. Si-50 that is available from Toyo Machinery & Metal Co., Ltd. Then two weakly laser-absorptive molded workpieces 1 and 2 having the length of 80 mm, the width of 50 mm and the thickness of 1 mm were prepared.

(4-b) Manufacture of Laser-Welded Article

Then, the edges of each weakly laser-absorptive molded workpiece 1 and 2 were butted and put together as shown in FIG. 1. The diode laser machine having 10 W of the output power that is available from Fine Device Co., Ltd. was used. The scanning laser beam 4 of the wavelength of 940 nm was continuously irradiated along an interface of the workpieces 1 and 2 under 2 mm/sec. of scanning speed for 20 mm to obtain a laser-welded article joined uniformly.

The absorbance and the absorption coefficient of the weakly laser-absorptive molded workplaces evaluated by following procedures were shown in Table 1. The result of the laser-welding was also shown in Table 1.

Example 5

(5-a) Preparation of Weakly Laser-Absorptive Molded Workpiece 499.75 g of a polyamide 66 resin of catalog No. ZYTEL 101NC available from Du Pont that ZYTEL is a registered trademark and 0.25 g of nigrosine of catalog No. CRAMITY 81 available from Orient Chemical Industries, Ltd. that CRAMITY is a registered trademark, were added in a tumbler made of stainless steel and were mixed with stirring for 1 hour. The obtained mixture was molded at 280° C. of temperature of a cylinder and 60° C. of temperature of a metal mold with general procedures using an injection molding machine of catalog No. Si-50 that is available from Toyo Machinery & Metal Co., Ltd. Then two weakly laser-absorptive molded workpieces 1 and 2 having the length of 80 mm, the width of 50 mm and the thickness of 1 mm were prepared.

(5-b) Manufacture of Laser-Welded Article

Then, the edges of each weakly laser-absorptive molded workpiece 1 and 2 were butted and put together as shown in FIG. 1. The diode laser machine having 10 W of the output power that is available from Fine Device Co., Ltd. was used. The scanning laser beam 4 of the wavelength of 940 nm was continuously irradiated along an interface of the workpieces 1 and 2 under 1 mm/sec. of scanning speed for 20 mm to obtain a laser-welded article joined uniformly.

The absorbance and the absorption coefficient of the weakly laser-absorptive molded workpieces evaluated by following procedures were shown in Table 1. The result of the laser-welding was also shown in Table 1.

Example 6

(6-a) Preparation of Weakly Laser-Absorptive Molded Workpiece 498.5 g of a polyamide 66 resin of catalog No. ZYTEL 101NC available from Du Pont that ZYTEL is a registered trademark, 0.5 g of nigrosine of catalog No. CRAMITY 81 available from Orient Chemical Industries, Ltd. that CRAMITY is a registered trademark, and 1.0 g of a black combination dye that C.I. Solvent Green 87 of an anthraquinone-type blue oil-soluble dye, C.I. Solvent Red 179 of a perinone-type red oil-soluble dye and C.I. Solvent Yellow 163 of an anthraquinone-type yellow oil-soluble dye were combined in a weight ratio of 13:20:7 in order, were added in a tumbler made of stainless steel and were mixed with stirring for 1 hour. The obtained mixture was molded at 280° C. of temperature of a cylinder and 60° C. of temperature of a metal mold with general procedures using an injection molding machine of catalog No. Si-50 that is available from Toyo Machinery & Metal Co., Ltd. Then two weakly laser-absorptive molded workpieces 1 and 2 having the length of 80 mm, the width of 50 mm and the thickness of 1 mm were prepared.

(6-b) Manufacture of Laser-Welded Article

Then, the edges of each weakly laser-absorptive molded workplace 1 and 2 were butted and put together as shown in FIG. 1. The diode laser machine having 10 W of the output power that is available from Fine Device Co., Ltd. was used. The scanning laser beam 4 of the wavelength of 940 nm was continuously irradiated along an interface of the workpieces 1 and 2 under 2 mm/sec. of scanning speed for 20 mm to obtain a laser-welded article joined uniformly.

The absorbance and the absorption coefficient of the weakly laser-absorptive molded workpieces evaluated by following procedures were shown in Table 1. The result of the laser-welding was also shown in Table 1.

Example 7

(7-a) Preparation of Weakly Laser-Absorptive Molded Workpiece 499.5 g of a polyamide 66 resin of catalog No. ZYTEL 101NC available from Du Pont that ZYTEL is a registered trademark and 0.5 g of nigrosine of catalog No. CRAMITY 81 available from Orient Chemical Industries, Ltd. that CRAMITY is a registered trademark, were added in a tumbler made of stainless steel and were mixed with stirring for 1 hour. The obtained mixture was molded at 280° C. of temperature of a cylinder and 60° C. of temperature of a metal mold with general procedures using an injection molding machine of catalog No. Si-50 that is available from Toyo Machinery & Metal Co., Ltd. Then the weakly laser-absorptive molded workpiece 1 having the length of 50 mm, the width of 230 mm and the thickness of 1 mm were prepared. The obtained workplace 1 was curled to obtain a cylinder-shape workpiece having 70 mm of diameter.

(7-b) Manufacture of Laser-Welded Article

Then, both edges of the weakly laser-absorptive molded workpiece 1 were butted and put together as shown in FIG. 2.

The diode laser machine having 10 W of the output power that is available from Fine Device Co., Ltd. was used. The scanning laser beam 4 of the wavelength of 940 nm was continuously irradiated along an interface of the edges of the workpiece 1 under 2 mm/sec. of scanning speed for 20 mm to obtain a laser-welded article joined uniformly.

The absorbance and the absorption coefficient of the weakly laser-absorptive molded workpiece evaluated by following procedures were shown in Table 1. The result of the laser-welding was also shown in Table 1.

Example 8

(8-a) Preparation of Weakly Laser-Absorptive Molded Workpiece 499.4 g of a polyamide 66 resin of catalog No. ZYTEL 101NC available from Du Pont that ZYTEL is a registered trademark and 0.6 g of nigrosine of catalog No. CRAMITY 81 available from Orient Chemical Industries, Ltd. that CRAMITY is a registered trademark, were added in a tumbler made of stainless steel and were mixed with stirring for 1 hour. The obtained mixture was molded at 280° C. of temperature of a cylinder and 60° C. of temperature of a metal mold with general procedures using an injection molding machine of catalog No. Si-50 that is available from Toyo Machinery & Metal Co., Ltd. A sheet having the length of 50 mm, the width of 160 mm and the thickness of 1 mm were prepared. The sheet was bent inward in the direction of the width to 20 mm, 40 mm, 40 mm, 40 mm, 20 mm in order, and both edges of the sheet was butted. Then the weakly laser-absorptive molded workpiece 1 having square pole-shape was prepared.

(8-b) Manufacture of Laser-Welded Article

Then, both edges of the weakly laser-absorptive molded workpiece 1 were butted and put together as shown in FIG. 3. The diode laser machine having 10 W of the output power that is available from Fine Device Co., Ltd. was used. The scanning laser beam 4 of the wavelength of 940 nm was continuously irradiated along an interface of the edges of the workpiece 1 under 2 mm/sec. of scanning speed for 20 mm to obtain a laser-welded article joined uniformly.

The absorbance and the absorption coefficient of the weakly laser-absorptive molded workpiece evaluated by following procedures were shown in Table 1. The result of the laser-welding was also shown in Table 1.

Example 9

(9-a) Preparation of Weakly Laser-Absorptive Molded Workpiece 499.75 g of a fiber-reinforced polyamide 6 resin of catalog No. AMILAN CM1016 available from Toray Industries, Inc. that AMILAN is a registered trademark and 0.25 g of nigrosine of catalog No. CRAMITY 81 available from Orient Chemical Industries, Ltd. that CRAMITY is a registered trademark, were added in a tumbler made of stainless steel and were mixed with stirring for 1 hour. The obtained mixture was molded at 280° C. of temperature of a cylinder and 80° C. of temperature of a metal mold with general procedures using an injection molding machine of catalog No. Si-50 that is available from Toyo Machinery & Metal Co., Ltd. Then two weakly laser-absorptive molded workpieces 1 and 2 having the length of 80 mm, the width of 50 mm and the thickness of 2 mm were prepared.

(9-b) Manufacture of Laser-Welded Article

Then, the edges of each weakly laser-absorptive molded workpiece 1 and 2 were butted and put together as shown in FIG. 1. The diode laser machine having 30 W of the output power that is available from Fine Device Co., Ltd. was used. The scanning laser beam 4 of the wavelength of 940 nm was continuously irradiated along an interface of the workpieces 1 and 2 under 0.7 mm/sec. of scanning speed for 20 mm to obtain a laser-welded article joined uniformly.

The absorbance and the absorption coefficient of the weakly laser-absorptive molded workpieces evaluated by following procedures were shown in Table 1. The result of the laser-welding was also shown in Table 1.

Example 10

(10-a) Preparation of Weakly Laser-Absorptive Molded Workpiece 499.75 g of a fiber-reinforced polyamide 6 resin of catalog No. AMILAN CM1016 available from Toray Industries, Inc. that AMILAN is a registered trademark and 0.25 g of nigrosine of catalog No. CRAMITY 81 available from Orient Chemical Industries, Ltd. that CRAMITY is a registered trademark, were added in a tumbler made of stainless steel and were mixed with stirring for 1 hour. The obtained mixture was molded at 280° C. of temperature of a cylinder and 80° C. of temperature of a metal mold with general procedures using an injection molding machine of catalog No. Si-50 that is available from Toyo Machinery & Metal Co., Ltd. Then two weakly laser-absorptive molded workpieces 1 and 2 having the length of 80 mm, the width of 50 mm and the thickness of 2 mm were prepared.

(10-b) Manufacture of Laser-Welded Article

Then, the edges of each weakly laser-absorptive molded workpiece 1 and 2 were butted and put together as shown in FIG. 1. The diode laser machine having 30 W of the output power that is available from Fine Device Co., Ltd. was used. The scanning laser beam 4 of the wavelength of 940 nm was continuously irradiated along an interface of the workpieces 1 and 2 under 0.7 mm/sec. of scanning speed for 20 mm. Furthermore, the scanning laser beam 4 was irradiated along an opposite side of the interface of the workpieces 1 and 2 under 0.7 mm/sec. of scanning speed to obtain a laser-welded article joined uniformly.

The absorbance and the absorption coefficient of the weakly laser-absorptive molded workpieces evaluated by following procedures were shown in Table 1. The result of the laser-welding was also shown in Table 1.

Comparative Example 1

(1-A) Preparation of Comparative Molded Workpiece 495 g of a polyamide 66 resin of catalog No. ZYTEL 101NC available from Du Pont that ZYTEL is a registered trademark and 5 g of nigrosine of catalog No. CRAMITY 81 available from Orient Chemical Industries, Ltd. that CRAMITY is a registered trademark, were molded at 280° C. of temperature of a cylinder and 60° C. of temperature of a metal mold with general procedures using an injection molding machine of catalog No. Si-50 that is available from Toyo Machinery & Metal Co., Ltd. Then two comparative molded workpieces having the length of 80 mm, the width of 50 mm and the thickness of 2 mm were prepared.

(1-B) Manufacture of Laser-Welded Article

Then, the edges of each comparative molded workpiece were butted and put together as shown in FIG. 1. The diode laser machine having 10 W of the output power that is available from Fine Device Co., Ltd. was used. The scanning laser beam 4 of the wavelength of 940 nm was continuously irradiated along an interface of the comparative molded workpieces under 1 mm/sec. of scanning speed for 20 mm. However, a laser-welded article joined uniformly was not obtained.

The absorbance and the absorption coefficient of the comparative molded workpieces evaluated by following procedures were shown in Table 1. The result of the laser-welding was also shown in Table 1.

Comparative Example 2

(2-A) Preparation of Comparative Molded Workpiece 499.999 g of a polyamide 66 resin of catalog No. ZYTEL 101NC available from Du Pont that ZYTEL is a registered trademark and 0.001 g of nigrosine of catalog No. CRAMITY 81 available from Orient Chemical Industries, Ltd. that CRAMITY is a registered trademark, were added in a tumbler made of stainless steel and were mixed with stirring for 1 hour. The obtained mixture was molded at 270° C. of temperature of a cylinder and 60° C. of temperature of a metal mold with general procedures using an injection molding machine of catalog No. Si-50 that is available from Toyo Machinery & Metal Co., Ltd. Then two comparative molded workpieces having the length of 80 mm, the width of 50 mm and the thickness of 1 mm were prepared.

(2-B) Manufacture of Laser-Welded Article

Then, the edges of each comparative molded workpiece were butted and put together as shown in FIG. 1. The diode laser machine having 10 W of the output power that is available from Fine Device Co., Ltd. was used. The scanning laser beam 4 of the wavelength of 940 nm was continuously irradiated along an interface of the comparative molded workpieces under 1 mm/sec. of scanning speed for 20 mm. However, a laser-welded article was not obtained.

The absorbance and the absorption coefficient of the comparative molded workpieces evaluated by following procedures were shown in Table 1. The result of the laser-welding was also shown in Table 1.

The weakly laser-absorptive molded workpieces were manufactured experimentally by using a polycarbonate resin, and then the edge portions of the molded workpieces were butted as shown in FIG. 1 or FIG. 3 and were welded by the laser. Examples of experimentally manufacturing the laser-welded articles to which the present invention was applied are shown in Examples 11 to 17. Examples of the laser-welded articles to which the present invention was not applied are shown in Comparative Examples 3 to 4.

Example 11

(11-a) Preparation of Weakly Laser-Absorptive Molded Workpiece 497.5 g of a polycarbonate resin of catalog No. Panlite L1225Y that is available from TEIJIN Limited and 2.5 g of nigrosine of catalog No. NUBIAN BLACK PC0850 available from Orient Chemical Industries, Ltd. that NUBIAN is a registered trademark, were added in a tumbler made of stainless steel and were mixed with stirring for 1 hour. The obtained mixture was molded at 280° C. of temperature of a cylinder and 70° C. of temperature of a metal mold with general procedures using an injection molding machine of catalog No. Si-50 that is available from Toyo Machinery & Metal Co., Ltd. Then two weakly laser-absorptive molded workpieces 1 and 2 having the length of 80 mm, the width of 50 mm and the thickness of 1 mm were prepared.

(11-b) Manufacture of Laser-Welded Article

Then, the edges of each weakly laser-absorptive molded workpiece 1 and 2 were butted and put together as shown in FIG. 1. The diode laser machine having 10 W of the output power that is available from Fine Device Co., Ltd. was used. The scanning laser beam 4 of the wavelength of 940 nm was continuously irradiated along an interface of the workpieces 1 and 2 under 1 mm/sec. of scanning speed for 20 mm to obtain a laser-welded article joined uniformly.

Incidentally the absorption coefficient: $\epsilon$ of nigrosine of NUBIAN (the registered trademark) BLACK PC0850 to ray of 940 nm in DMF was $4.8\times10^3$ (ml/g·cm).

The absorbance and the absorption coefficient of the weakly laser-absorptive molded workpieces evaluated by following procedures were shown in Table 2. The result of the laser-welding was also shown in Table 2.

Example 12

(12-a) Preparation of Weakly Laser-Absorptive Molded Workpiece 498.5 g of a polycarbonate resin of catalog No. Panlite L3225Y that is available from TEIJIN Limited and 1.5 g of nigrosine of catalog No. NUBIAN BLACK PC0850 available from Orient Chemical Industries, Ltd. that NUBIAN is a registered trademark, were added in a tumbler made of stainless steel and were mixed with stirring for 1 hour. The obtained mixture was molded at 280° C. of temperature of a cylinder and 70° C. of temperature of a metal mold with general procedures using an injection molding machine of catalog No. Si-50 that is available from Toyo Machinery & Metal Co., Ltd. Then two weakly laser-absorptive molded workpieces 1 and 2 having the length of 80 mm, the width of 50 mm and the thickness of 1 mm were prepared.

(12-b) Manufacture of Laser-Welded Article

Then, the edges of each weakly laser-absorptive molded workpiece 1 and 2 were butted and put together as shown in FIG. 1. The diode laser machine having 10 W of the output power that is available from Fine Device Co., Ltd. was used. The scanning laser beam 4 of the wavelength of 940 nm was continuously irradiated along an interface of the workpieces 1 and 2 under 1 mm/sec. of scanning speed for 20 mm to obtain a laser-welded article joined uniformly.

The absorbance and the absorption coefficient of the weakly laser-absorptive molded workpieces evaluated by following procedures were shown in Table 2. The result of the laser-welding was also shown in Table 2.

Example 13

(13-a) Preparation of Weakly Laser-Absorptive Molded Workpiece 499 g of a polycarbonate resin of catalog No. Panlite L1225Y that is available from TEIJIN Limited and 1.0 g of nigrosine of catalog No. NUBIAN BLACK PC0850 available from Orient Chemical Industries, Ltd. that NUBIAN is a registered trademark, were added in a tumbler made of stainless steel and were mixed with stirring for 1 hour. The obtained mixture was molded at 280° C. of temperature of a cylinder and 70° C. of temperature of a metal mold with general procedures using an injection molding machine of catalog No. Si-50 that is available from Toyo Machinery & Metal Co., Ltd. Then two weakly laser-absorptive molded workpieces 1 and 2 having the length of 80 mm, the width of 50 mm and the thickness of 1 mm were prepared.

(13-b) Manufacture of Laser-Welded Article

Then, the edges of each weakly laser-absorptive molded workpiece 1 and 2 were butted and put together as shown in FIG. 1. The diode laser machine having 10 W of the output power that is available from Fine Device Co., Ltd. was used. The scanning laser beam 4 of the wavelength of 940 nm was continuously irradiated along an interface of the workpieces 1 and 2 under 2 mm/sec. of scanning speed for 20 mm to obtain a laser-welded article joined uniformly.

The absorbance and the absorption coefficient of the weakly laser-absorptive molded workpieces evaluated by following procedures were shown in Table 2. The result of the laser-welding was also shown in Table 2.

Example 14

(14-a) Preparation of Weakly Laser-Absorptive Molded Workpiece 499.75 g of a polycarbonate resin of catalog No. Panlite L1225Y that is available from TEIJIN Limited and 0.25 g of nigrosine of catalog No. NUBIAN BLACK PC0850 available from Orient Chemical Industries, Ltd. that NUBIAN is a registered trademark, were added in a tumbler made of stainless steel and were mixed with stirring for 1 hour. The obtained mixture was molded at 280° C. of temperature of a cylinder and 70° C. of temperature of a metal mold with general procedures using an injection molding machine of catalog No. Si-50 that is available from Toyo Machinery & Metal Co., Ltd. Then two weakly laser-absorptive molded workpieces 1 and 2 having the length of 80 mm, the width of 50 mm and the thickness of 1 mm were prepared.

(14-b) Manufacture of Laser-Welded Article

Then, the edges of each weakly laser-absorptive molded workpiece 1 and 2 were butted and put together as shown in FIG. 1. The diode laser machine having 10 W of the output power that is available from Fine Device Co., Ltd. was used. The scanning laser beam 4 of the wavelength of 940 nm was continuously irradiated along an interface of the workpieces 1 and 2 under 1 mm/sec. of scanning speed for 20 mm to obtain a laser-welded article joined uniformly.

The absorbance and the absorption coefficient of the weakly laser-absorptive molded workpieces evaluated by following procedures were shown in Table 2. The result of the laser-welding was also shown in Table 2.

Example 15

(15-a) Preparation of Weakly Laser-Absorptive Molded Workpiece 498.5 g of a polycarbonate resin of catalog No. Panlite L1225Y that is available from TEIJIN Limited, 0.5 g of nigrosine of catalog No. NUBIAN BLACK PC0850 available from Orient Chemical Industries, Ltd. that NUBIAN is a registered trademark, and 1.0 g of a black combination dye that C.I. Solvent Green 87 of an anthraquinone-type blue oil-soluble dye, C.I. Solvent Red 179 of a perinone-type red oil-soluble dye and C.I. Solvent Yellow 163 of an anthraquinone-type yellow oil-soluble dye were combined in a weight ratio of 13:20:7 in order, were added in a tumbler made of stainless steel and were mixed with stirring for 1 hour. The obtained mixture was molded at 280° C. of temperature of a cylinder and 70° C. of temperature of a metal mold with general procedures using an injection molding machine of catalog No. Si-50 that is available from Toyo Machinery & Metal Co., Ltd. Then two weakly laser-absorptive molded workpieces 1 and 2 having the length of 80 mm, the width of 50 mm and the thickness of 1 mm were prepared.

(15-b) Manufacture of Laser-Welded Article

Then, the edges of each weakly laser-absorptive molded workpiece 1 and 2 were butted and put together as shown in FIG. 1. The diode laser machine having 10 W of the output power that is available from Fine Device Co., Ltd. was used. The scanning laser beam 4 of the wavelength of 940 nm was continuously irradiated along an interface of the workpieces 1 and 2 under 2 mm/sec. of scanning speed for 20 mm to obtain a laser-welded article joined uniformly.

The absorbance and the absorption coefficient of the weakly laser-absorptive molded workpieces evaluated by following procedures were shown in Table 2. The result of the laser-welding was also shown in Table 2.

Example 16

(16-a) Preparation of Weakly Laser-Absorptive Molded Workpiece 499 g of a polycarbonate resin of catalog No. Panlite L1225Y that is available from TEIJIN Limited and 1.0 g of nigrosine of catalog No. NUBIAN BLACK PC0850 available from Orient Chemical Industries, Ltd. that NUBIAN is a registered trademark, were added in a tumbler made of stainless steel and were mixed with stirring for 1 hour. The obtained mixture was molded at 280° C. of temperature of a cylinder and 70° C. of temperature of a metal mold with general procedures using an injection molding machine of catalog No. Si-50 that is available from Toyo Machinery & Metal Co., Ltd. A sheet having the length of 50 mm, the width of 160 mm and the thickness of 1 mm were prepared. The sheet was bent inward in the direction of the width to 20 mm, 40 mm, 40 mm, 40 mm, 20 mm in order, and both edges of the sheet was butted. Then the weakly laser-absorptive molded workpiece 1 having square pole-shape was prepared.

(16-b) Manufacture of Laser-Welded Article

Then, both edges of the weakly laser-absorptive molded workpiece 1 were butted and put together as shown in FIG. 3. The diode laser machine having 10 W of the output power that is available from Fine Device Co., Ltd. was used. The scanning laser beam 4 of the wavelength of 940 nm was continuously irradiated along an interface of the edges of the workpiece 1 under 2 mm/sec. of scanning speed for 20 mm to obtain a laser-welded article joined uniformly.

The absorbance and the absorption coefficient of the weakly laser-absorptive molded workpiece evaluated by following procedures were shown in Table 2. The result of the laser-welding was also shown in Table 2.

Example 17

(17-a[1]) Preparation of Weakly Laser-Absorptive Molded Workpiece 498.5 g of a polycarbonate resin of catalog No. Panlite L1225Y that is available from TEIJIN Limited, 0.5 g of nigrosine of catalog No. NUBIAN BLACK PC0850 available from Orient Chemical Industries, Ltd. that NUBIAN is a registered trademark, and 1.0 g of a black combination dye that C.I. Solvent Green 87 of an anthraquinone-type blue oil-soluble dye, C.I. Solvent Red 179 of a perinone-type red oil-soluble dye and C.I. Solvent Yellow 163 of an anthraquinone-type yellow oil-soluble dye were combined in a weight ratio of 13:20:7 in order, were added in a tumbler made of stainless steel and were mixed with stirring for 1 hour. The obtained mixture was molded at 280° C. of temperature of a cylinder and 70° C. of temperature of a metal mold with general procedures using an injection molding machine of catalog No. Si-50 that is available from Toyo Machinery & Metal Co., Ltd. Then the weakly laser-absorptive molded workpiece 1 having the length of 80 mm, the width of 50 mm and the thickness of 1 mm was prepared.

(17-a[2]) Preparation of Weakly Laser-Absorptive Molded Workpiece 499.25 g of a polycarbonate resin of catalog No. Panlite L1225Y that is available from TEIJIN Limited and 0.75 g of nigrosine of catalog No. NUBIAN BLACK PC0850 available from Orient Chemical Industries, Ltd. that NUBIAN is a registered trademark, were added in a tumbler made of stainless steel and were mixed with stirring for 1 hour. The obtained mixture was molded at 280° C. of temperature of a cylinder and 70° C. of temperature of a metal mold with general procedures using an injection molding machine of catalog No. Si-50 that is available from Toyo Machinery & Metal Co., Ltd. Then the weakly laser-absorptive molded workpiece 2 having the length of 80 mm, the width of 50 mm and the thickness of 2 mm was prepared.

(17-b) Manufacture of Laser-Welded Article

Then, the edges of each weakly laser-absorptive molded workpiece 1 and 2 were butted and put together as shown in FIG. 1. The diode laser machine having 10 W of the output power that is available from Fine Device Co., Ltd. was used. The scanning laser beam 4 of the wavelength of 940 nm was continuously irradiated along an interface of the workpieces 1 and 2 under 2 mm/sec. of scanning speed for 20 mm to obtain a laser-welded article joined uniformly.

The absorbance and the absorption coefficient of the weakly laser-absorptive molded workpieces evaluated by following procedures were shown in Table 2. The result of the laser-welding was also shown in Table 2.

Comparative Example 3

(3-A) Preparation of Comparative Molded Workpiece 500 g of a polycarbonate resin of catalog No. Panlite L1225Y that is available from TEIJIN Limited was added in a tumbler made of stainless steel and was mixed with stirring for 1 hour. The obtained mixture was molded at 280° C. of temperature of a cylinder and 70° C. of temperature of a metal mold with general procedures using an injection molding machine of catalog No. Si-50 that is available from Toyo Machinery & Metal Co., Ltd. Then two comparative molded workpieces having the length of 60 mm, the width of 12 mm and the thickness of 1 mm were prepared.

(3-B) Manufacture of Laser-Welded Article

Then, the edges of each comparative molded workpieces were butted and put together as shown in FIG. 1. The diode laser machine having 10 W of the output power that is available from Fine Device Co., Ltd, was used. The scanning laser beam 4 of the wavelength of 940 nm was continuously irradiated along an interface of the workpieces under 1 mm/sec. of scanning speed for 20 mm to obtain a laser-welded article joined uniformly.

Comparative Example 4

(4-A) Preparation of Comparative Molded Workpiece 499 g of a polycarbonate resin of catalog No. Panlite L1225Y that is available from TEIJIN Limited and 1.0 g of a carbon black of catalog No. #32 that is available from Mitsubishi Chemical Corporation were added in a tumbler made of stainless steel and was mixed with stirring for 1 hour. The obtained mixture was molded at 280° C. of temperature of a cylinder and 70° C. of temperature of a metal mold with general procedures using an injection molding machine of catalog No. Si-50 that is available from Toyo Machinery & Metal Co., Ltd. Then two comparative molded workpieces having the length of 60 mm, the width of 12 mm and the thickness of 1 mm were prepared.

(4-B) Manufacture of Laser-Welded Article

Then, the edges of each comparative molded workpieces were butted and put together as shown in FIG. 1. The diode laser machine having 10 W of the output power that is available from Fine Device Co., Ltd. was used. The scanning laser beam 4 of the wavelength of 940 nm was continuously irradiated along an interface of the workpieces under 1 mm/sec. of scanning speed for 20 mm to obtain a laser-welded article joined uniformly.

The weakly laser-absorptive molded workpieces were manufactured experimentally by using a polybutylene terephthalate resin, and then the edge portions of the molded workpieces were butted as shown in FIG. 1 and were welded by the laser. Examples of experimentally manufacturing the laser-welded articles to which the present invention was applied are shown in Examples 18 to 23. Example of the laser-welded articles to which the present invention was not applied is shown in Comparative Example 5.

Example 18

(18-a) Preparation of Weakly Laser-Absorptive Molded Workpiece 499.95 g of a polybutylene terephthalate resin of catalog No. NOVADURAN MY5008 available from Mitsubishi Engineering-Plastics Corporation that NOVADURAN is a registered trademark, and 0.05 g of nigrosine of catalog No. NUBIAN BLACK PA9803 available from Orient Chemical Industries, Ltd. that NUBIAN is a registered trademark, were added in a tumbler made of stainless steel and were mixed with stirring for 1 hour. The obtained mixture was molded at 260° C. of temperature of a cylinder and 60° C. of temperature of a metal mold with general procedures using an injection molding machine of catalog No. Si-50 that is available from Toyo Machinery & Metal Co., Ltd. Then two weakly laser-absorptive molded workpieces 1 and 2 having the length of 80 mm, the width of 50 mm and the thickness of 1.5 mm were prepared.

(18-b) Manufacture of Laser-Welded Article

Then, the edges of each weakly laser-absorptive molded workpiece 1 and 2 were butted and put together as shown in FIG. 1. The diode laser machine having 30 W of the output power that is available from Fine Device Co., Ltd. was used. The scanning laser beam 4 of the wavelength of 940 nm was continuously irradiated along an interface of the workpieces 1 and 2 under 2.5 mm/sec. of scanning speed for 20 mm to obtain a laser-welded article joined uniformly.

Incidentally the absorption coefficient: $\epsilon$ of nigrosine of NUBIAN (the registered trademark) BLACK PA9803 to ray of 940 nm in DMF was $6.4\times10^3$ (ml/g·cm).

The absorbance and the absorption coefficient of the weakly laser-absorptive molded workpieces evaluated by following procedures were shown in Table 3. The result of the laser-welding was also shown in Table 3.

Example 19

(19-a$^1$) Preparation of Weakly Laser-Absorptive Molded Workpiece 499.975 g of a polybutylene terephthalate resin of catalog No. NOVADURAN MY5008 available from Mitsubishi Engineering-Plastics Corporation that NOVADURAN is a registered trademark, and 0.025 g of nigrosine of catalog No. NUBIAN BLACK PA9803 available from Orient Chemical Industries, Ltd. that NUBIAN is a registered trademark, were added in a tumbler made of stainless steel and were mixed with stirring for 1 hour. The obtained mixture was molded at 260° C. of temperature of a cylinder and 60° C. of temperature of a metal mold with general procedures using an injection molding machine of catalog No. Si-50 that is available from Toyo Machinery & Metal Co., Ltd. Then the weakly laser-absorptive molded workpiece 1 having the length of 80 mm, the width of 50 mm and the thickness of 1.5 mm was prepared.

(19-a$^2$) Preparation of Weakly Laser-Absorptive Molded Workpiece 499.975 g of a polybutylene terephthalate resin of catalog No. NOVADURAN MY5008 available from Mitsubishi Engineering-Plastics Corporation that NOVADURAN is a registered trademark, and 0.025 g of nigrosine of catalog No. NUBIAN BLACK PA9803 available from Orient Chemical Industries, Ltd. that NUBIAN is a registered trademark, were added in a tumbler made of stainless steel and were mixed with stirring for 1 hour. The obtained mixture was molded at 260° C. of temperature of a cylinder and 60° C. of temperature of a metal mold with general procedures using an injection molding machine of catalog No. Si-50 that is available from Toyo Machinery & Metal Co., Ltd. Then the weakly laser-absorptive molded workpiece 2 having the length of 80 mm, the width of 50 mm and the thickness of 1 mm was prepared.

(19-b) Manufacture of Laser-Welded Article

Then, the edges of each weakly laser-absorptive molded workpiece 1 and 2 were butted and put together as shown in FIG. 1. The diode laser machine having 30 W of the output power that is available from Fine Device Co., Ltd. was used. The scanning laser beam 4 of the wavelength, of 940 nm was continuously irradiated along an interface of the workpieces 1 and 2 under 1.5 mm/sec. of scanning speed for 20 mm to obtain a laser-welded article joined uniformly.

The absorbance and the absorption coefficient of the weakly laser-absorptive molded workpieces evaluated by following procedures were shown in Table 3. The result of the laser-welding was also shown in Table 3.

Example 20

(20-a) Preparation of Weakly Laser-Absorptive Molded Workpiece 499.5 g of a polybutylene terephthalate resin of catalog No. NOVADURAN MY5008 available from Mitsubishi Engineering-Plastics Corporation that NOVADURAN is a registered trademark, and 0.5 g of nigrosine of catalog No. NUBIAN BLACK PA9803 available from Orient Chemical Industries, Ltd. that NUBIAN is a registered trademark, were added in a tumbler made of stainless steel and were mixed with stirring for 1 hour. The obtained mixture was molded at 260° C. of temperature of a cylinder and 60° C. of temperature of a metal mold with general procedures using an injection molding machine of catalog No. Si-50 that is available from Toyo Machinery & Metal Co., Ltd. Then two weakly laser-absorptive molded workpieces 1 and 2 having the length of 80 mm, the width of 50 mm and the thickness of 1 mm were prepared.

(20-b) Manufacture of Laser-Welded Article

Then, the edges of each weakly laser-absorptive molded workpiece 1 and 2 were butted and put together as shown in FIG. 1. The diode laser machine having 10 W of the output power that is available from Fine Device Co., Ltd. was used. The scanning laser beam 4 of the wavelength of 940 nm was continuously irradiated along an interface of the workpieces 1 and 2 under 2 mm/sec. of scanning speed for 20 mm to obtain a laser-welded article joined uniformly.

The absorbance and the absorption coefficient of the weakly laser-absorptive molded workpieces evaluated by following procedures were shown in Table 3. The result of the laser-welding was also shown in Table 3.

Example 21

(21-a) Preparation of Weakly Laser-Absorptive Molded Workpiece 499.75 g of a polybutylene terephthalate resin of catalog No. NOVADURAN MY5008 available from Mitsubishi Engineering-Plastics Corporation that NOVADURAN is a registered trademark, and 0.25 g of nigrosine of catalog No. NUBIAN BLACK PA9803 available from Orient Chemical Industries, Ltd. that NUBIAN is a registered trademark, were added in a tumbler made of stainless steel and were mixed with stirring for 1 hour. The obtained mixture was molded at 260° C. of temperature of a cylinder and 60° C. of temperature of a metal mold with general procedures using an injection molding machine of catalog No Si-50 that is available from Toyo Machinery & Metal Co., Ltd. Then two weakly laser-absorptive molded workpieces 1 and 2 having the length of 80 mm, the width of 50 mm and the thickness of 1 mm were prepared.

(21-b) Manufacture of Laser-Welded Article

Then, the edges of each weakly laser-absorptive molded workpiece 1 and 2 were butted and put together as shown in FIG. 1. The diode laser machine having 10 W of the output power that is available from Fine Device Co., Ltd. was used. The scanning laser beam 4 of the wavelength of 940 nm was continuously irradiated along an interface of the workpieces 1 and 2 under 1 mm/sec. of scanning speed for 20 mm to obtain a laser-welded article joined uniformly.

The absorbance and the absorption coefficient of the weakly laser-absorptive molded workpieces evaluated by following procedures were shown in Table 3. The result of the laser-welding was also shown in Table 3.

Example 22

(22-a$^1$) Preparation of Weakly Laser-Absorptive Molded Workpiece 499.99 g of a polybutylene terephthalate resin of catalog No. NOVADURAN MY5008 available from Mitsubishi Engineering-Plastics Corporation that NOVADURAN is a registered trademark, and 0.01 g of nigrosine of catalog No. NUBIAN BLACK PA9803 available from Orient Chemical Industries, Ltd. that NUBIAN is a registered trademark, were added in a tumbler made of stainless steel and were mixed with stirring for 1 hour. The obtained mixture was molded at 260° C. of temperature of a cylinder and 60° C. of temperature of a metal mold with general procedures using an injection molding machine of catalog No. Si-50 that is available from Toyo Machinery & Metal Co., Ltd. Then the weakly laser-absorptive molded workpiece 1 having the length of 80 mm, the width of 50 mm and the thickness of 1.5 mm was prepared.

(22-a$^2$) Preparation of Weakly Laser-Absorptive Molded Workpiece 499.975 g of a polybutylene terephthalate resin of catalog No. NOVADURAN MY5008 available from Mitsubishi Engineering-Plastics Corporation that NOVADURAN is a registered trademark, and 0.025 g of nigrosine of catalog No. NUBIAN BLACK PA9803 available from Orient Chemical Industries, Ltd. that NUBIAN is a registered trademark, were added in a tumbler made of stainless steel and were mixed with stirring for 1 hour. The obtained mixture was molded at 260° C. of temperature of a cylinder and 60° C. of temperature of a metal mold with general procedures using an injection molding machine of catalog No. Si-50 that is available from Toyo Machinery & Metal Co., Ltd. Then the weakly laser-absorptive molded workpiece 2 having the length of 80 mm, the width of 50 mm and the thickness of 1.5 mm was prepared.

(22-b) Manufacture of Laser-Welded Article

Then, the edges of each weakly laser-absorptive molded workpiece 1 and 2 were butted and put together as shown in FIG. 1. The diode laser machine having 30 W of the output power that is available from Fine Device Co., Ltd. was used. The scanning laser beam 4 of the wavelength of 940 nm was continuously irradiated along an interface of the workpieces 1 and 2 under 0.4 mm/sec. of scanning speed for 20 mm to obtain a laser-welded article joined uniformly.

The absorbance and the absorption coefficient of the weakly laser-absorptive molded workpieces evaluated by following procedures were shown in Table 3. The result of the laser-welding was also shown in Table 3.

Example 23

(23-a) Preparation of Weakly Laser-Absorptive Molded Workpiece 499 g of a polybutylene terephthalate resin of catalog No. NOVADURAN MY5008 available from Mitsubishi Engineering-Plastics Corporation that NOVADURAN is a registered trademark, and 1.0 g of nigrosine of catalog No. NUBIAN BLACK PA9803 available from Orient Chemical Industries, Ltd. that NUBIAN is a registered trademark, were added in a tumbler made of stainless steel and were mixed with stirring for 1 hour. The obtained mixture was molded at 260° C. of temperature of a cylinder and 60° C. of temperature of a metal mold with general procedures using an injection molding machine of catalog No. Si-50 that is available from Toyo Machinery & Metal Co., Ltd. Then two weakly laser-absorptive molded workpieces 1 and 2 having the length of 80 mm, the width of 50 mm and the thickness of 1 mm were prepared.

(23-b) Manufacture of Laser-Welded Article

Then, the edges of each weakly laser-absorptive molded workpiece 1 and 2 were butted and put together as shown in FIG. 1. The diode laser machine having 10 W of the output power that is available from Fine Device Co., Ltd. was used. The scanning laser beam 4 of the wavelength of 940 nm was continuously irradiated along an interface of the workpieces 1 and 2 under 2 mm/sec. of scanning speed for 20 mm to obtain a laser-welded article joined uniformly.

The absorbance and the absorption coefficient of the weakly laser-absorptive molded workpieces evaluated by following procedures were shown in Table 3. The result of the laser-welding was also shown in Table 3.

Comparative Example 5

(5-A) Preparation of Comparative Molded Workpiece 500 g of a polybutylene terephthalate resin of catalog No. NOVADURAN MY5008 available from Mitsubishi Engineering-Plastics Corporation that NOVADURAN is a registered trademark was molded at 260° C. of temperature of a cylinder and 60° C. of temperature of a metal mold with general procedures using an injection molding machine of catalog No. Si-50 that is available from Toyo Machinery & Metal Co., Ltd. Then two comparative molded workpieces 1 and 2 having the length of 80 mm, the width of 50 mm and the thickness of 1 mm were prepared.

(5-B) Manufacture of Laser-Welded Article

Then, the edges of each comparative molded workpiece 1 and 2 were butted and put together as shown in FIG. 1. The diode laser machine having 10 W of the output power that is available from Fine Device Co., Ltd. was used. The scanning laser beam 4 of the wavelength of 940 nm was continuously irradiated along an interface of the workpieces 1 and 2 under 1 mm/sec. of scanning speed for 20 mm. However, a laser-welded article joined uniformly was not obtained.

The absorbance and the absorption coefficient of the comparative molded workpieces evaluated by following procedures were shown in Table 3. The result of the laser-welding was also shown in Table 3.

The weakly laser-absorptive molded workpieces were manufactured experimentally by using a polyphenylene sulfide resin, and then the edge portions of the molded workpieces were butted as shown in FIG. 1 and were welded by the laser. Examples of experimentally manufacturing the laser-welded articles to which the present invention was applied are shown in Examples 24 to 27. Example of the laser-welded articles to which the present invention was not applied is shown in Comparative Example 6.

Example 24

(24-d) Preparation of Weakly Laser-Absorptive Molded Workpiece 499.95 g of a polyphenylene sulfide resin of catalog No. FORTRON 0220A9 available from Polyplastics Co., Ltd. that FORTRON is a registered trademark, and 0.05 g of nigrosine of catalog No. NUBIAN BLACK PA9803 available from Orient Chemical Industries, Ltd. that NUBIAN is a registered trademark, were added in a tumbler made of stainless steel and were mixed with stirring for 1 hour. The obtained mixture was molded at 310° C. of temperature of a cylinder and 150° C. of temperature of a metal mold with general procedures using an injection molding machine of catalog No. Si-50 that is available from Toyo Machinery & Metal Co., Ltd. Then two weakly laser-absorptive molded workpieces 1 and 2 having the length of 80 mm, the width of 50 mm and the thickness of 1.5 mm were prepared.

(24-b) Manufacture of Laser-Welded Article

Then, the edges of each weakly laser-absorptive molded workpiece 1 and 2 were butted and put together as shown in FIG. 1. The diode laser machine having 30 W of the output power that is available from Fine Device Co., Ltd. was used. The scanning laser beam 4 of the wavelength of 940 nm was continuously irradiated along an interface of the workpieces 1 and 2 under 2.5 mm/sec. of scanning speed for 20 mm to obtain a laser-welded article joined uniformly.

The absorbance and the absorption coefficient of the weakly laser-absorptive molded workpieces evaluated by following procedures were shown in Table 4. The result of the laser-welding was also shown in Table 4.

Example 25

(25-a) Preparation of Weakly Laser-Absorptive Molded Workpiece 499.975 g of a polyphenylene sulfide resin of catalog No. FORTRON 0220A9 available from Polyplastics Co., Ltd. that FORTRON is a registered trademark, and 0.025 g of nigrosine of catalog No. NUBIAN BLACK PA9803 available from Orient Chemical Industries, Ltd. that NUBIAN is a registered trademark, were added in a tumbler made of stainless steel and were mixed with stirring for 1 hour. The obtained mixture was molded at 310° C. of temperature of a cylinder and 150° C. of temperature of a metal mold with general procedures using an injection molding machine of catalog No. Si-50 that is available from Toyo Machinery & Metal Co., Ltd. Then two weakly laser-absorptive molded workpieces 1 and 2 having the length of 80 mm, the width of 50 mm and the thickness of 1.5 mm were prepared.

(25-b) Manufacture of Laser-Welded Article

Then, the edges of each weakly laser-absorptive molded workpiece 1 and 2 were butted and put together as shown in FIG. 1. The diode laser machine having 30 W of the output power that is available from Fine Device Co., Ltd. was used. The scanning laser beam 4 of the wavelength of 940 nm was continuously irradiated along an interface of the workpieces 1 and 2 under 1 mm/sec. of scanning speed for 20 mm to obtain a laser-welded article joined uniformly.

The absorbance and the absorption coefficient of the weakly laser-absorptive molded workpieces evaluated by following procedures were shown in Table 4. The result of the laser-welding was also shown in Table 4.

Example 26

(26-a) Preparation of Weakly Laser-Absorptive Molded Workpiece 499.75 g of a polyphenylene sulfide resin of catalog No. FORTRON 0220A9 available from Polyplastics Co., Ltd. that FORTRON is a registered trademark, and 0.25 g of nigrosine of catalog No. NUBIAN BLACK PA9803 available from Orient Chemical Industries, Ltd. that NUBIAN is a registered trademark, were added in a tumbler made of stainless steel and were mixed with stirring for 1 hour. The obtained mixture was molded at 310° C. of temperature of a cylinder and 150° C. of temperature of a metal mold with general procedures using an injection molding machine of catalog No. Si-50 that is available from Toyo Machinery & Metal Co., Ltd. Then two weakly laser-absorptive molded workpieces 1 and 2 having the length of 80 mm, the width of 50 mm and the thickness of 1 mm were prepared.

(26-b) Manufacture of Laser-Welded Article

Then, the edges of each weakly laser-absorptive molded workpiece 1 and 2 were butted and put together as shown in FIG. 1. The diode laser machine having 10 W of the output power that is available from Fine Device Co., Ltd. was used. The scanning laser beam 4 of the wavelength of 940 nm was continuously irradiated along an interface of the workpieces 1 and 2 under 1 mm/sec. of scanning speed for 20 mm to obtain a laser-welded article joined uniformly.

The absorbance and the absorption coefficient of the weakly laser-absorptive molded workpieces evaluated by following procedures were shown in Table 4. The result of the laser-welding was also shown in Table 4.

Example 27

(27-a) Preparation of Weakly Laser-Absorptive Molded Workpiece 499.99 g of a polyphenylene sulfide resin of catalog No. FORTRON 0220A9 available from Polyplastics Co., Ltd. that FORTRON is a registered trademark, and 0.01 g of nigrosine of catalog No. NUBIAN BLACK PA9803 available from Orient Chemical Industries, Ltd. that NUBIAN is a registered trademark, were added in a tumbler made of stainless steel and were mixed with stirring for 1 hour. The obtained mixture was molded at 310° C. of temperature of a cylinder and 150° C. of temperature of a metal mold with general procedures using an injection molding machine of catalog No. Si-50 that is available from Toyo Machinery & Metal Co., Ltd. Then two weakly laser-absorptive molded workpieces 1 and 2 having the length of 80 mm, the width of 50 mm and the thickness of 1.5 mm were prepared.

(27-b) Manufacture of Laser-Welded Article

Then, the edges of each weakly laser-absorptive molded workpiece 1 and 2 were butted and put together as shown in FIG. 1. The diode laser machine having 30 W of the output power that is available from Fine Device Co., Ltd. was used. The scanning laser beam 4 of the wavelength of 940 nm was continuously irradiated along an interface of the workpieces 1 and 2 under 0.5 mm/sec. of scanning speed for 20 mm to obtain a laser-welded article joined uniformly.

The absorbance and the absorption coefficient of the weakly laser-absorptive molded workpieces evaluated by following procedures were shown in Table 4. The result of the laser-welding was also shown in Table 4.

Comparative Example 6

(6-A) Preparation of Comparative Molded Workpiece 500 g of a polyphenylene sulfide resin of catalog No. FORTRON 0220A9 available from Polyplastics Co., Ltd. that FORTRON is a registered trademark was molded at 310° C. of temperature of a cylinder and 150° C. of temperature of a metal mold with general procedures using an injection molding machine of catalog No. Si-50 that is available from Toyo Machinery & Metal Co., Ltd. Then two comparative molded workpieces 1 and 2 having the length of 80 mm, the width of 50 mm and the thickness of 1 mm were prepared. The absorbance of obtained workpieces was 7 or more.

(6-B) Manufacture of Laser-Welded Article

Then, the edges of each comparative molded workpiece 1 and 2 were butted and put together as shown in FIG. 1. The diode laser machine having 10 W of the output power that is available from Fine Device Co., Ltd. was used. The scanning laser beam 4 of the wavelength of 940 nm was continuously irradiated along an interface of the workpieces 1 and 2 under 1 mm/sec. of scanning speed for 20 mm. However, a laser-welded article joined uniformly was not obtained.

The absorbance and the absorption coefficient of the comparative molded workpieces evaluated by following procedures were shown in Table 4. The result of the laser-welding was also shown in Table 4.

The weakly laser-absorptive molded workpieces were manufactured experimentally by using a polypropylene resin, and then the edge portions of the molded workpieces are butted as shown in FIG. 1 and they were welded by the laser. Examples of experimentally manufacturing the laser-welded articles to which the present invention was applied are shown in Examples 28 to 31. Example of the laser-welded articles to which the present invention was not applied is shown in Comparative Example 7.

Example 28

(28-a) Preparation of Weakly Laser-Absorptive Molded Workpiece 497.5 g of a polypropylene resin of catalog No. NOVATEC BC05B available from Japan Polypropylene Corporation that NOVATEC is a registered trademark, and 2.5 g of nigrosine of catalog No. NUBIAN BLACK PC0850 available from Orient Chemical Industries, Ltd. that NUBIAN is a registered trademark, were added in a tumbler made of stainless steel and were mixed with stirring for 1 hour. The obtained mixture was molded at 200° C. of temperature of a cylinder and 40° C. of temperature of a metal mold with general procedures using an injection molding machine of catalog No. Si-50 that is available from Toyo Machinery & Metal Co., Ltd. Then two weakly laser-absorptive molded workpieces 1 and 2 having the length of 80 mm, the width of 50 mm and the thickness of 1 mm were prepared.

(28-b) Manufacture of Laser-Welded Article

Then, the edges of each weakly laser-absorptive molded workpiece 1 and 2 were butted and put together as shown in FIG. 1. The diode laser machine having 10 W of the output power that is available from Fine Device Co., Ltd. was used. The scanning laser beam 4 of the wavelength of 940 nm was continuously irradiated along an interface of the workpieces 1 and 2 under 2 mm/sec. of scanning speed for 20 mm to obtain a laser-welded article joined uniformly.

The absorbance and the absorption coefficient of the weakly laser-absorptive molded workpieces evaluated by following procedures were shown in Table 5. The result of the laser-welding was also shown in Table 5.

Example 29

(29-a) Preparation of Weakly Laser-Absorptive Molded Workpiece 498.5 g of a polypropylene resin of catalog No. NOVATEC BC05B available from Japan Polypropylene Corporation that NOVATEC is a registered trademark, and 1.5 g of nigrosine of catalog No. NUBIAN BLACK PC0850 available from Orient Chemical Industries, Ltd. that NUBIAN is a registered trademark, were added in a tumbler made of stainless steel and were mixed with stirring for 1 hour. The obtained mixture was molded at 200° C. of temperature of a cylinder and 40° C. of temperature of a metal mold with general procedures using an injection molding machine of catalog No. Si-50 that is available from Toyo Machinery & Metal Co., Ltd. Then two weakly laser-absorptive molded workpieces 1 and 2 having the length of 80 mm, the width of 50 mm and the thickness of 1 mm were prepared.

(29-b) Manufacture of Laser-Welded Article

Then, the edges of each weakly laser-absorptive molded workpiece 1 and 2 were butted and put together as shown in FIG. 1. The diode laser machine having 10 W of the output power that is available from Fine Device Co., Ltd. was used. The scanning laser beam 4 of the wavelength of 940 nm was continuously irradiated along an interface of the workpieces 1 and 2 under 2 mm/sec. of scanning speed for 20 mm to obtain a laser-welded article joined uniformly.

The absorbance and the absorption coefficient of the weakly laser-absorptive molded workpieces evaluated by following procedures were shown in Table 5. The result of the laser-welding was also shown in Table 5.

Example 30

(30-a) Preparation of Weakly Laser-Absorptive Molded Workpiece 499.95 g of a polypropylene resin of catalog No. NOVATEC BC05B available from Japan Polypropylene Corporation that NOVATEC is a registered trademark, and 0.05 g of a naphthalocyanine of catalog No. YKR-5010 that is available from Yamamoto Chemicals, Inc., were added in a tumbler made of stainless steel and were mixed with stirring for 1 hour. The obtained mixture was molded at 200° C. of temperature of a cylinder and 40° C. of temperature of a metal mold with general procedures using an injection molding machine of catalog No. Si-50 that is available from Toyo Machinery & Metal Co., Ltd. Then two weakly laser-absorptive molded workpieces 1 and 2 having the length of 80 mm, the width of 50 mm and the thickness of 1.5 mm were prepared.

(30-b) Manufacture of Laser-Welded Article

Then, the edges of each weakly laser-absorptive molded workpiece 1 and 2 were butted and put together as shown in FIG. 1. The diode laser machine having 30 W of the output power that is available from Fine Device Co., Ltd. was used. The scanning laser beam 4 of the wavelength of 940 nm was continuously irradiated along an interface of the workpieces 1 and 2 under 0.7 mm/sec. of scanning speed for 20 mm to obtain a laser-welded article joined uniformly.

The absorbance and the absorption coefficient of the weakly laser-absorptive molded workpieces evaluated by following procedures were shown in Table 5. The result of the laser-welding was also shown in Table 5.

Example 31

(31-a[1]) Preparation of Weakly Laser-Absorptive Molded Workpiece 499.975 g of a polypropylene resin of catalog No. NOVATEC BC05B available from Japan Polypropylene Corporation that NOVATEC is a registered trademark, and 0.025 g of a naphthalocyanine of catalog No. YKR-5010 that is available from Yamamoto Chemicals, Inc., were added in a tumbler made of stainless steel and were mixed with stirring for 1 hour. The obtained mixture was molded at 200° C. of temperature of a cylinder and 40° C. of temperature of a metal mold with general procedures using an injection molding machine of catalog No. Si-50 that is available from Toyo Machinery & Metal Co., Ltd. Then the weakly laser-absorptive molded workpiece 1 having the length of 80 mm, the width of 50 mm and the thickness of 1.5 mm was prepared.

(31-a[2]) Preparation of Weakly Laser-Absorptive Molded Workpiece 499.975 g of a polypropylene resin of catalog No. NOVATEC BC05B available from Japan Polypropylene Corporation that NOVATEC is a registered trademark, and 0.025 g of a naphthalocyanine of catalog No. YKR-5010 that is available from Yamamoto Chemicals, Inc., were added in a tumbler made of stainless steel and were mixed with stirring for 1 hour. The obtained mixture was molded at 200° C. of temperature of a cylinder and 40° C. of temperature of a metal mold with general procedures using an injection molding machine of catalog No. Si-50 that is available from Toyo Machinery & Metal Co., Ltd. Then the weakly loser-absorptive molded workpiece 2 having the length of 80 mm, the width of 50 mm and the thickness of 1.0 mm was prepared.

(31-b) Manufacture of Laser-Welded Article

Then, the edges of each weakly laser-absorptive molded workpiece 1 and 2 were butted and put together as shown in FIG. 1. The diode laser machine having 30 W of the output power that is available from Fine Device Co., Ltd. was used. The scanning laser beam 4 of the wavelength of 940 nm was continuously irradiated along an interface of the workpieces 1 and 2 under 0.5 mm/sec. of scanning speed for 20 mm to obtain a laser-welded article joined uniformly.

The absorbance and the absorption coefficient of the weakly laser-absorptive molded workpieces evaluated by following procedures were shown in Table 5. The result of the laser-welding was also shown in Table 5.

Comparative Example 7

(7-A) Preparation of Comparative Molded Workpiece 500 g of a polypropylene resin of catalog No. NOVATEC BC05B available from Japan Polypropylene Corporation that NOVATEC is a registered trademark was added in a tumbler made of stainless steel and was mixed with stirring for 1 hour. The obtained mixture was molded at 200° C. of temperature of a cylinder and 40° C. of temperature of a metal mold with general procedures using an injection molding machine of catalog No. Si-50 that is available from Toyo Machinery & Metal Co., Ltd. Then two comparative molded workpieces 1 and 2 having the length of 80 mm, the width of 50 mm and the thickness of 1 mm were prepared.

(7-B) Manufacture of Laser-Welded Article

Then, the edges of each comparative molded workpiece 1 and 2 were butted and put together as shown in FIG. 1. The diode laser machine having 10 W of the output power that is available from Fine Device Co., Ltd. was used. The scanning laser beam 4 of the wavelength of 940 nm was continuously irradiated along an interface of the workpieces 1 and 2 under 2 mm/sec. of scanning speed for 20 mm to obtain a laser-welded article joined uniformly.

The absorbance and the absorption coefficient of the comparative molded workpieces evaluated by following procedures were shown in Table 5. The result of the laser-welding was also shown in Table 5.

(Physical Evaluations)

The workpieces and the laser-welded articles thereof obtained in Examples and Comparative Examples were evaluated by the following procedures for physical evaluations.

(1) Calculation of Absorbance and Absorption coefficient ($\epsilon_j$)

The absorption coefficient was calculated as follows. By using a spectrophotometer of catalog No. V-570 which is available from JASCO Corporation, the absorbance A of the weakly laser-absorptive molded workpieces 1 and 2 under the wavelength of 940 nm was calculated by Lambert-Beer law which is represented by the following numerical expression (1)

$$\text{Absorbance } A = -\text{Log } T = -\text{Log } \{I_T/(I_O - I_R)\} \quad (1)$$

[In the expression (1), $I_O$ is the incident light intensity, $I_T$ is the transmitted light intensity, $I_R$ is the reflected light intensity]. And the absorbance $a_1$ converted into the absorbance of the molded workpiece with 1 mm thickness was shown. Furthermore, a calibration curve was prepared. The absorbance A is represented by the following numerical expression (2).

$$\text{Absorbance } A=\epsilon_j C_1 L_1 \quad (2)$$

Therefore, the absorption coefficient $\epsilon_{j1}$ (l/cm) was calculated from the slope of the calibration curve. The absorbance and the absorption coefficient of the molded workpiece containing colorant other than nigrosine are calculated similarly. The absorbance $a_2$ and the absorption coefficient $\epsilon_{j2}$ are calculated similarly.

(2) Tensile Strength Test

As regards the loser-welded articles obtained in Examples and Comparative Examples, the tensile strength test using a tensile strength tester of catalog No. AG-50kNE, which is available from Shimadzu Corporation, was executed as follows in order to determine the tensile strength of the welding thereof. In accordance with Japanese Industrial Standard K 7113-1995, the tensile strength of the welding was measured by tensing the laser-welded article to both opposite dimensions of lengthwise, which pulls the welding position apart, under 10 mm/min. of tensile speed.

(3) Visual Observation of Appearance

The appearance of the welded portion of the laser-welded articles obtained in Examples and Comparative Examples was judged by the visual observation.

The results of the physical evaluations of the laser-welded articles of Examples and Comparative Examples are shown in Tables 1 to 5 together.

TABLE 1

| | | Example | | | | | | | | | | Comp. Ex. | |
|---|---|---|---|---|---|---|---|---|---|---|---|---|---|
| | | 1 | 2 | 3 | 4 | 5 | 6 | 7 | 8 | 9 | 10 | 1 | 2 |
| *1 Composition Rate (wt %) | Polyamide 66 | 99.5 | 99.7 | 99.88 | 99.9 | 99.95 | 99.7 | 99.9 | 99.88 | 0 | 0 | 99 | 99.9998 |
| | Polyamide 6 | 0 | 0 | 0 | 0 | 0 | 0 | 0 | 0 | 99.95 | 99.95 | 0 | 0 |
| | Nigrosine | 0.5 | 0.3 | 0.12 | 0.1 | 0.05 | 0.1 | 0.1 | 0.12 | 0.05 | 0.05 | 1.0 | 0.0002 |
| | Carbon Black | 0 | 0 | 0 | 0 | 0 | 0 | 0 | 0 | 0 | 0 | 0 | 0 |
| | Black Colorant | 0 | 0 | 0 | 0 | 0 | 0.2 | 0 | 0 | 0 | 0 | 0 | 0 |
| Property | Thickness (mm) | 1 | 1 | 1 | 1 | 1 | 1 | 1 | 1 | 2 | 2 | 1 | 1 |
| | *$\epsilon_{j1}$ ($\times 10^3$) | 3.9 | 3.9 | 3.9 | 3.9 | 3.9 | 3.9 | 3.9 | 3.9 | 4.3 | 4.3 | 3.9 | 3.9 |
| | Absorbance A | 2.01 | 1.20 | 0.80 | 0.46 | 0.24 | 0.48 | 0.46 | 0.80 | 0.26 | 0.26 | 5.73 | 0.04 |
| | *Absorbance $a_1$ | 2.01 | 1.20 | 0.80 | 0.46 | 0.24 | 0.48 | 0.46 | 0.80 | 0.13 | 0.13 | 5.73 | 0.04 |
| *2 Composition Rate (wt %) | Polyamide 66 | 99.5 | 99.7 | 99.88 | 99.9 | 99.95 | 99.7 | — | — | 0 | 0 | 99 | 99.9998 |
| | Polyamide 6 | 0 | 0 | 0 | 0 | 0 | 0 | — | — | 99.95 | 99.95 | 0 | 0 |
| | Nigrosine | 0.5 | 0.3 | 0.12 | 0.1 | 0.05 | 0.1 | — | — | 0.05 | 0.05 | 1.0 | 0.0002 |
| | Carbon Black | 0 | 0 | 0 | 0 | 0 | 0 | — | — | 0 | 0 | 0 | 0 |
| | Black Colorant | 0 | 0 | 0 | 0 | 0 | 0.2 | — | — | 0 | 0 | 0 | 0 |
| Property | Thickness (mm) | 1 | 1 | 2 | 1 | 1 | 1 | — | — | 2 | 2 | 1 | 1 |
| | *($\epsilon_{j2}$) ($\times 10^3$) | 3.9 | 3.9 | 3.9 | 3.9 | 3.9 | 3.9 | — | — | 4.3 | 4.3 | 3.9 | 3.9 |
| | Absorbance A | 2.01 | 1.20 | 0.80 | 0.46 | 0.24 | 0.48 | — | — | 0.26 | 0.26 | 5.73 | 0.04 |
| | Absorbance $a_2$ | 2.01 | 1.20 | 0.80 | 0.46 | 0.24 | 0.48 | — | — | 0.13 | 0.13 | 5.73 | 0.04 |
| Laser Welding | Scanning Speed (mm/sec) | 2 | 2 | 1 | 2 | 1 | 2 | 2 | 2 | 0.7 | 0.7 | 1 | 1 |
| | Output Power of Laser (W) | 10 | 10 | 10 | 10 | 10 | 10 | 10 | 10 | 30 | 30 | 10 | 10 |
| | Tensile Strength (N) | 316.0 | 421.0 | 607.0 | 217.0 | 102.0 | 227.3 | 209.0 | 583.0 | 1048.6 | 1771.5 | *No | *No |
| | Appearance | *Ex | *Ex | *Ex | *Ex | *Ex | *Ex | *Ex | *Ex | *Ex | *Ex | — | — |

In the Table 1,

*1: Weakly Laser-absorptive Molded Workpiece 1

*2: Weakly Laser-absorptive Molded Workplace 2

*$\epsilon_{j1}$ ($\epsilon_{j2}$): Absorption Coefficident $\epsilon_{j1}$ ($\epsilon_{j2}$) ($\times 10^3$)

*Absorbance $a_1$ ($a_2$): Absorbance $a_1$ ($a_2$) converted into the absorbance of the molded workpiece with 1 mm thickness

*No: Not Welding

*Ex: Excellent

TABLE 2

| | | | Example | | | | | | | Comp. Ex. | |
|---|---|---|---|---|---|---|---|---|---|---|---|
| | | | 11 | 12 | 13 | 14 | 15 | 16 | 17 | 3 | 4 |
| Weakly Laser-absorptive Molded Workpiece 1 | Composition Rate (wt %) | Polycarbonate | 99.5 | 99.7 | 99.8 | 99.95 | 99.7 | 99.8 | 99.7 | 100 | 99.8 |
| | | Nigrosine | 0.5 | 0.3 | 0.2 | 0.05 | 0.1 | 0.2 | 0.1 | 0 | 0 |
| | | Carbon Black | 0 | 0 | 0 | 0 | 0 | 0 | 0 | 0 | 0.2 |
| | | Black Colorant | 0 | 0 | 0 | 0 | 0.2 | 0 | 0.2 | 0 | 0 |
| | Property | Thickness (mm) | 1 | 1 | 1 | 1 | 1 | 1 | 1 | 1 | 1 |
| | | Absorption Coefficident $\epsilon_{j1}$($\times 10^3$) | 3.3 | 3.3 | 3.3 | 3.3 | 3.3 | 3.3 | 3.3 | — | 10.7 |
| | | Absorbance A | 1.69 | 1.02 | 0.67 | 0.2 | 0.39 | 0.69 | 0.39 | 0.03 | 5.80 |
| | | *Absorbance $a_1$ | 1.69 | 1.02 | 0.67 | 0.2 | 0.39 | 0.69 | 0.39 | 0.03 | 5.80 |

TABLE 2-continued

| | | | Example | | | | | | | Comp. Ex. | |
|---|---|---|---|---|---|---|---|---|---|---|---|
| | | | 11 | 12 | 13 | 14 | 15 | 16 | 17 | 3 | 4 |
| Weakly Laser-absorptive Molded Workpiece 2 | Composition Rate (wt %) | Poly-carbonate | 99.5 | 99.7 | 99.8 | 99.95 | 99.7 | — | 99.85 | 100 | 99.8 |
| | | Nigrosine | 0.5 | 0.3 | 0.2 | 0.05 | 0.1 | — | 0.15 | 0 | 0 |
| | | Carbon Black | 0 | 0 | 0 | 0 | 0 | — | 0 | 0 | 0.2 |
| | | Black Colorant | 0 | 0 | 0 | 0 | 0.2 | — | 0 | 0 | 0 |
| | Property | Thickness (mm) | 1 | 1 | 1 | 1 | 1 | — | 2 | 1 | 1 |
| | | Absorption Coefficident ($\epsilon_{j2}$)($\times 10^3$) | 3.3 | 3.3 | 3.3 | 3.3 | 3.3 | — | 3.3 | — | 10.7 |
| | | Absorbance A | 1.69 | 1.02 | 0.67 | 0.2 | 0.39 | — | 0.98 | 0.03 | 5.80 |
| | | *Absorbance $a_2$ | 1.69 | 1.02 | 0.67 | 0.2 | 0.39 | — | 0.49 | 0.03 | 5.80 |
| Laser Welding | Scanning Speed (mm/sec) | | 1 | 1 | 2 | 1 | 2 | 2 | 2 | 1 | 1 |
| | Output Power of Laser (W) | | 10 | 10 | 10 | 10 | 10 | 10 | 10 | 10 | 10 |
| | Tensile Strength (N) | | 509.2 | 530.5 | 419.6 | 249.7 | 387.3 | 412.4 | 433.7 | *No | *No |
| | Appearance | | *Ex | *Ex | *Ex | *Ex | *Ex | *Ex | *Ex | — | — |

*Absorbance $a_1$ ($a_2$): Absorbance $a_1$ ($a_2$) converted into the absorbance of the molded workpiece with 1 mm thickness

*No: Not Welding

*Ex: Excellent

TABLE 3

| | | | Example | | | | | | Comp. |
|---|---|---|---|---|---|---|---|---|---|
| | | | 18 | 19 | 20 | 21 | 22 | 23 | Ex 5 |
| Weakly Laser-absorptive Molded Workpiece 1 | Composition Rate (wt %) | Polybutylene Terephthalate | 99.99 | 99.995 | 99.9 | 99.95 | 99.998 | 99.8 | 100 |
| | | Nigrosine | 0.01 | 0.005 | 0.1 | 0.05 | 0.002 | 0.2 | 0 |
| | | Naphthalocyanine | 0 | 0 | 0 | 0 | 0 | 0 | 0 |
| | | Carbon Black | 0 | 0 | 0 | 0 | 0 | 0 | 0 |
| | Property | Thickness (mm) | 1.5 | 1.5 | 1 | 1 | 1.5 | 1 | 1 |
| | | Absorption Coefficident $\epsilon_{j1}$($\times 10^3$) | 11.5 | 11.5 | 11.5 | 11.5 | 11.5 | 11.5 | 0 |
| | | Absorbance A | 0.71 | 0.57 | 1.67 | 1.10 | 0.23 | 2.50 | 0.05 |
| | | *Absorbance $a_1$ | 0.47 | 4.38 | 1.67 | 1.10 | 0.15 | 2.50 | 0.05 |
| Weakly Laser-absorptive Molded Workpiece 2 | Composition Rate (wt %) | Polybutylene Terephthalate | 99.99 | 99.995 | 99.9 | 99.95 | 99.995 | 99.8 | 100 |
| | | Nigrosine | 0.01 | 0.005 | 0.1 | 0.05 | 0.005 | 0.2 | 0 |
| | | Naphthalocyanine | 0 | 0 | 0 | 0 | 0 | 0 | 0 |
| | | Carbon Black | 0 | 0 | 0 | 0 | 0 | 0 | 0 |
| | Property | Thickness (mm) | 1.5 | 1 | 1 | 1 | 1.5 | 1 | 1 |
| | | Absorption Coefficident ($\epsilon_{j2}$)($\times 10^3$) | 11.5 | 11.5 | 11.5 | 11.5 | 11.5 | 11.5 | 0 |
| | | Absorbance A | 0.71 | 0.38 | 1.67 | 1.10 | 0.57 | 2.50 | 0.05 |
| | | *Absorbance $a_2$ | 0.47 | 0.38 | 1.67 | 1.10 | 0.38 | 2.50 | 0.05 |
| Laser Welding | Scanning Speed (mm/sec) | | 2.5 | 1.5 | 2 | 1 | 0.4 | 2 | 1 |
| | Output Power of Laser (W) | | 30 | 30 | 10 | 10 | 30 | 10 | 10 |
| | Tensile Strength (N) | | 710.2 | 647.5 | 312.1 | 472.3 | 676.9 | 312.7 | *No |
| | Appearance | | *Ex | *Ex | *Ex | *Ex | *Ex | *Ex | — |

*Absorbance $a_1$ ($a_2$): Absorbance $a_1$ ($a_2$) converted into the absorbance of the molded workpiece with 1 mm thickness

*No: Not Welding

*Ex: Excellent

TABLE 4

| | | | Example | | | | Comp. |
|---|---|---|---|---|---|---|---|
| | | | 24 | 25 | 26 | 27 | Ex 6 |
| Weakly Laser-absorptive Molded Workpiece 1 | Composition Rate (wt %) | Polyphenylene sulfide | 99.99 | 99.995 | 99.95 | 99.998 | 100 |
| | | Nigrosine | 0.01 | 0.005 | 0.05 | 0.002 | 0 |
| | | Naphthalocyanine | 0 | 0 | 0 | 0 | 0 |
| | | Carbon Black | 0 | 0 | 0 | 0 | 0 |
| | Property | Thickness (mm) | 1.5 | 1.5 | 1 | 1.5 | 1 |
| | | Absorption Coefficident $\epsilon_{j1}(\times 10^3)$ | 10.8 | 10.8 | 10.8 | 10.8 | 0 |
| | | Absorbance A | 0.72 | 0.5 | 1.19 | 0,3 | 0.04 |
| | | *Absorbance $a_1$ | 0.48 | 0.33 | 1.19 | 0.2 | 0.04 |
| Weakly Laser-absorptive Molded Workpiece 2 | Composition Rate (wt %) | Polyphenylene sulfide | 99.99 | 99.995 | 99.95 | 99.998 | 100 |
| | | Nigrosine | 0.01 | 0.005 | 0.05 | 0.002 | 0 |
| | | Naphthalocyanine | 0 | 0 | 0 | 0 | 0 |
| | | Carbon Black | 0 | 0 | 0 | 0 | 0 |
| | Property | Thickness (mm) | 1.5 | 1.5 | 1 | 1.5 | 1 |
| | | Absorption Coefficident $(\epsilon_{j2})(\times 10^3)$ | 10.8 | 10.8 | 10,8 | 10.8 | 0 |
| | | Absorbance A | 0.72 | 0.5 | 1.19 | 0.3 | 0.04 |
| | | *Absorbance $a_2$ | 0.48 | 0.33 | 1.19 | 0.2 | 0.04 |
| Laser Welding | Scanning Speed (mm/sec) | | 2.5 | 1 | 1 | 0.5 | 1 |
| | Output Power of Laser (W) | | 30 | 30 | 10 | 30 | 10 |
| | Tensile Strength (N) | | 567.4 | 529.6 | 463.1 | 254.3 | *No |
| | Appearance | | *Ex | *Ex | *Ex | *Ex | — |

*Absorbance $a_1$ ($a_2$): Absorbance $a_1$ ($a_2$) converted into the absorbance of the molded workpiece with 1 mm thickness

*No: Not Welding

*Ex: Excellent

TABLE 5

| | | | Example | | | | Comp. |
|---|---|---|---|---|---|---|---|
| | | | 28 | 29 | 30 | 31 | Ex 7 |
| Weakly Laser-absorptive Molded Workplace 1 | Composition Rate (wt %) | Polypropylene | 99.5 | 99.7 | 99.99 | 99.995 | 100 |
| | | Nigrosine | 0.5 | 0.3 | 0 | 0 | 0 |
| | | Naphthalocyanine | 0 | 0 | 0.01 | 0.005 | 0 |
| | | Carbon Black | 0 | 0 | 0 | 0 | 0 |
| | Property | Thickness (mm) | 1 | 1 | 1.5 | 1.5 | 1 |
| | | Absorption Coefficident $\epsilon_{j1}(\times 10^3)$ | 1.5 | 1.5 | 2.2 | 2.2 | 0 |
| | | Absorbance A | 0.88 | 0.57 | 0.18 | 0.15 | 0.03 |
| | | *Absorbance $a_1$ | 0.88 | 0.57 | 0.12 | 0.10 | 0.03 |
| Weakly Laser-absorptive Molded Workplace 2 | Composition Rate (wt %) | Polypropylene | 99.5 | 99.7 | 99.99 | 99.995 | 100 |
| | | Nigrosine | 0.5 | 0.3 | 0 | 0 | 0 |
| | | Naphthalocyanine | 0 | 0 | 0.01 | 0.005 | 0 |
| | | Carbon Black | 0 | 0 | 0 | 0 | 0 |
| | Property | Thickness (mm) | 1 | 1 | 1.5 | 1 | 1 |
| | | Absorption Coefficident $(\epsilon_{j2})(\times 10^3)$ | 1.5 | 1.5 | 2.2 | 2.2 | 0 |
| | | Absorbance A | 0.88 | 0.57 | 0.18 | 0.10 | 0.03 |
| | | *Absorbance $a_2$ | 0.88 | 0.57 | 0.12 | 0.10 | 0.03 |
| Laser Welding | Scanning Speed (mm/sec) | | 2 | 2 | 0.7 | 0.5 | 2 |
| | Output Power of Laser (W) | | 10 | 10 | 30 | 30 | 10 |
| | Tensile Strength (N) | | 318.3 | 212.4 | 290.5 | 298.3 | *No |
| | Appearance | | *Ex | *Ex | *Ex | *Ex | — |

*Absorbance $a_1$ ($a_2$): Absorbance $a_1$ ($a_2$) converted into the absorbance of the molded workpiece with 1 mm thickness

*No: Not Welding

*Ex: Excellent

As it is evident with Table 1 to 5, the laser-welded articles of the present invention consist of the weakly laser-absorptive molded workpieces which are firmly welded respectively. The laser-welded articles have the excellent tensile strength and the excellent appearance at the portion of the laser-welding.

The laser-welded article of the present invention is used for automotive parts such as an instrument panel for automotive interior and a resonator (a silencer) in engine room; medical apparatus such as a medical tubing used for an instillation of infusion; food pouch such as a spout pouch used for sealing fluid diet and beverage composition; a label used for a bottle made of plastics; home electric appliances such as housing, for example.

What is claimed is:

1. A laser-welded article comprising:

an integral construction of a single weakly laser-absorptive molded workpiece or a plurality of weakly laser-absorptive molded workpieces, which is welded by heat generated from irradiation with a laser through laser welding by melting of butted portions of the single weakly laser-absorptive molded workpiece, or laser welding by melting of butted portions of the plurality of weakly laser-absorptive molded workpieces, where at least a part of the edge portions of the workpiece or the workpieces are butted, with no overlapping of the butted portions, the laser generating rays having a wavelength ranging from 800 nm to 1600 nm, wherein the workpiece or the workpieces have an absorbance "a" throughout the workpiece or the workpieces ranging, from 0.1 to 1.8 converted into an absorbance of the molded workpiece with 1 mm thickness, and have the ability of absorbing at least partial beam of the laser and transmitting another partial beam of the laser, the workpiece or the workpieces including:

a thermoplastic resin at least selected from the group consisting of polyamide resin, polycarbonate resin, polyphenylene sulfide resin, polybutylene terephthalate resin, and polypropylene resin, and a weakly laser absorbent of nigrosine dye, where the content of the weakly laser absorbent ranges from 0.01 to 0.5 weight % against the thermoplastic resin.

2. The laser-welded article according to claim 1, wherein the integral construction of the single weakly laser-absorptive molded workpiece is welded while butting edge portions of the single weakly laser-absorptive molded workpiece.

3. The laser-welded article according to claim 1, wherein the integral construction of the plurality of weakly laser-absorptive molded workpieces is welded while butting edge portions of the plurality of weakly laser-absorptive molded workpieces.

4. The laser-welded article according to claim 1, wherein a ratio $a_1/a_2$ defined by an absorbance "$a_1$" of a first workpiece of the plurality of weakly laser-absorptive molded workpieces and an absorbance "$a_2$" of a second workpiece ranges from 0.8 to 1.3.

5. The laser-welded article according to claim 4, wherein the ratio $a_1/a_2$ is 1.

6. The laser-welded article according to claim 1, wherein at least one of $C_1L_1$ and $C_2L_2$ ranges from $0.01\times10^{-3}$ to $4.0\times10^{-3}$, wherein $C_1L_1$ is a product of a concentration $C_1$ (weight %) of the weakly laser absorbent of a first workpiece of the integral construction of the plurality of weakly laser-absorptive molded workpieces, and $L_1$ (cm) is a thickness of the first workpiece, and $C_2L_2$ is a product of a concentration $C_2$ (weight %) of the weakly laser absorbent of a second workpiece, and $L_2$ (cm) is a thickness of the second workpiece.

7. The laser-welded article according to claim 1, wherein the single weakly laser-absorptive molded workpiece or the plurality of weakly laser-absorptive molded workpieces have a thickness ranging from 200 to 5000 microns.

8. The laser-welded article according to claim 1, wherein the weakly laser absorbent has an absorption coefficient $\epsilon_d$ ranging from 1000 to 8000 (ml/g·cm).

9. The laser-welded article according to claim 1, wherein the thermoplastic resin is polyamide resin and the absorbance "a" ranges from 0.1 to 1.8.

10. The laser-welded article according to claim 1, wherein the thermoplastic resin is polycarbonate resin and the absorbance "a" ranges from 0.2 to 1.8.

11. The laser-welded article according to claim 1, wherein the thermoplastic resin is polypropylene resin and the absorbance "a" ranges from 0.1 to 0.8.

*12. The laser-welded article according to claim 1, wherein the tensile stress strength of the prepared laser-welded article is 50N or more in accordance with Japanese Industrial Standard K-7113-1995.*

*13. A laser-welded article comprising:*

*an integral construction of a single weakly laser-absorptive molded workpiece or a plurality of weakly laser-absorptive molded workpieces, which is welded by heat generated from irradiation with a laser through laser welding by melting of butted portions of the single weakly laser-absorptive molded workpiece, or laser welding by melting of butted portions of the plurality of weakly laser-absorptive molded workpieces, where at least a part of the edge portions of the workpiece or the workpieces are butted, with no overlapping of the butted portions, the laser generating rays having a wavelength ranging from 800 nm to 1600 nm,*

*wherein the workpiece or the workpieces have an absorbance "a" throughout the workpiece or the workpieces ranging, from 0.1 to 1.8 converted into an absorbance of the molded workpiece with 1 mm thickness, and have the ability of absorbing at least partial beam of the laser and transmitting another partial beam of the laser, the workpiece or the workpieces including:*

*a thermoplastic resin at least selected from the group consisting of polyamide resin, polycarbonate resin, polyphenylene sulfide resin, polybutylene terephthalate resin, and polypropylene resin, and*

*a weakly laser absorbent of nigrosine dye selected from the group consisting of C.I. Solvent Black 5 and C.I. Solvent Black 7,*

*where the content of the weakly laser absorbent ranges from 0.01 to 0.5 weight % against the thermoplastic resin.*

*14. The laser-welded article according to claim 13, wherein the integral construction of the single weakly laser-absorptive molded workpiece is welded while butting edge portions of the single weakly laser-absorptive molded workpiece.*

*15. The laser-welded article according to claim 13, wherein the integral construction of the plurality of weakly laser-absorptive molded workpieces is welded while butting edge portions of the plurality of weakly laser-absorptive molded workpieces.*

*16. The laser-welded article according to claim 13, wherein a ratio $a_1/a_2$ defined by an absorbance "$a_1$" of a first*

*workpiece of the plurality of weakly laser-absorptive molded workpieces and an absorbance "$a_2$" of a second workpiece ranges from 0.8 to 1.3.*

*17. The laser-welded article according to claim 13, wherein at least one of $C_1L_1$ and $C_2L_2$ ranges from $0.01\times10^{-3}$ to $4.0\times10^{-3}$, wherein*

*$C_1L_1$ is a product of a concentration $C_1$ (weight %) of the weakly laser absorbent of a first workpiece of the integral construction of the plurality of weakly laser-absorptive molded workpieces, and $L_1$ (cm) is a thickness of the first workpiece, and*

*$C_2L_2$ is a product of a concentration $C_2$ (weight %) of the weakly laser absorbent of a second workpiece, and $L_2$ (cm) is a thickness of the second workpiece.*

*18. The laser-welded article according to claim 13, wherein the single weakly laser-absorptive molded workpiece or the plurality of weakly laser-absorptive molded workpieces have a thickness ranging from 200 to 5000 microns.*

*19. The laser-welded article according to claim 13, wherein the weakly laser absorbent has an absorption coefficient $\epsilon_d$ ranging from 1000 to 8000 (ml/gcm).*

*20. The laser-welded article according to claim 13, wherein the thermoplastic resin is polyamide resin and the absorbance "a" ranges from 0.1 to 1.8.*

*21. The laser-welded article according to claim 13, wherein the thermoplastic resin is polycarbonate resin and the absorbance "a" ranges from 0.2 to 1.8.*

*22. The laser-welded article according to claim 13, wherein the thermoplastic resin is polypropylene resin and the absorbance "a" ranges from 0.1 to 0.8.*

*23. The laser-welded article according to claim 16, wherein the ratio $a_1/a_2$ is 1.*

* * * * *